(12) United States Patent
Ueda et al.

(10) Patent No.: US 10,988,233 B2
(45) Date of Patent: Apr. 27, 2021

(54) WING AND AIRCRAFT

(71) Applicant: JAPAN AEROSPACE EXPLORATION AGENCY, Chofu (JP)

(72) Inventors: Yoshine Ueda, Tokyo (JP); Naoko Tokugawa, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 308 days.

(21) Appl. No.: 16/307,672

(22) PCT Filed: Feb. 21, 2017

(86) PCT No.: PCT/JP2017/006404
§ 371 (c)(1),
(2) Date: Dec. 6, 2018

(87) PCT Pub. No.: WO2017/217015
PCT Pub. Date: Dec. 21, 2017

(65) Prior Publication Data
US 2019/0217941 A1    Jul. 18, 2019

(30) Foreign Application Priority Data

Jun. 13, 2016 (JP) .............................. JP2016-116898

(51) Int. Cl.
*B64C 3/14*    (2006.01)
*B64C 30/00*   (2006.01)
(Continued)

(52) U.S. Cl.
CPC ................ *B64C 3/141* (2013.01); *B64C 3/10* (2013.01); *B64C 3/16* (2013.01); *B64C 30/00* (2013.01); *B64C 2003/149* (2013.01)

(58) Field of Classification Search
CPC ....... B64C 3/16; B64C 3/10; B64C 2003/149; B64C 33/00
See application file for complete search history.

(56) References Cited

U.S. PATENT DOCUMENTS

2007/0262207 A1* 11/2007 Morgenstern ............. B64C 9/22
                                                    244/214
2012/0166148 A1*  6/2012 Yoshida .................... B64F 5/00
                                                    703/1

FOREIGN PATENT DOCUMENTS

EP    2 466 288 A2    6/2012
JP    2012-126205 A   7/2012
JP    5747343 B2      7/2015

OTHER PUBLICATIONS

International Search Report dated Mar. 28, 2017, issued in counterpart International Application No. PCT/JP2017/006404, with English Translation. (3 pages).

(Continued)

*Primary Examiner* — Richard R. Green
*Assistant Examiner* — William L Gmoser
(74) *Attorney, Agent, or Firm* — Westerman, Hattori, Daniels & Adrian, LLP

(57) ABSTRACT

[Object] To provide a wing achieving reduction of friction drag and easy to design and also easy to manufacture and an aircraft including such a wing.
[Solving Means] A wing 1 is typically used as a main wing of an aircraft 100. The wing 1 is a swept-back wing having a swept-back angle A. The wing 1 is configured such that a surface pressure (pressure distribution (Cp)) on an upper surface of a vicinity of a leading edge 11 in a fluid increases from a wing root 17 to a wing tip 15. A cross-flow component of an external streamline of a surface of the wing 1 is reduced in the vicinity of the leading edge 11, and boundary layer transition is not easily induced in the vicinity of the (Continued)

leading edge 11. With this, friction drag caused by cross-flow instability can be reduced.

6 Claims, 26 Drawing Sheets

(51) Int. Cl.
  *B64C 3/10* (2006.01)
  *B64C 3/16* (2006.01)

(56) References Cited

OTHER PUBLICATIONS

Yoshine Ueda et al., "Supersonic Natural-Laminar-Flow Wing-Design Concept at High-Reynolds-Number Conditions", AIAA Journal, vol. 52, No. 6, Jun. 1, 2014, pp. 1294-1306, cited in Extended European Search Report dated Dec. 6, 2019. (13 pages).
Extended (Supplementary) European Search Report dated Dec. 6, 2019, issued in counterpart EP Application No. 17812924.3. (10 pages).
Office Action dated Nov. 20, 2019, issued in counterpart CA Application No. 3,027,330. (4 pages).
Olivier Vermeersch et al., "Natural laminar flow wing for supersonic conditions: Wind tunnel experiments, flight test and stability computations", Progress in Aerospace Sciences, vol. 79, Nov. 1, 2015, pp. 64-91, cited in Extended European Search Report dated Dec. 6, 2019. (28 pages).

* cited by examiner

WING AND AIRCRAFT

TECHNICAL FIELD

The present invention relates to a wing to be used for an aircraft and the like and an aircraft including such a wing.

BACKGROUND ART

It is an important problem to reduce drag in order to improve economic efficiency of aircrafts. Many aerodynamic design concepts for reducing pressure drag have been developed. Meanwhile, a beneficial concept for reducing friction drag in order to further reduce drag has not been produced.

In a swept-back wing, boundary layer transition is easily induced in the vicinity of a leading edge due to a physical mechanism called cross-flow instability (C-F instability). Therefore, it has been considered that it is difficult to realize natural laminarization over a wide range.

Yoshine UEDA, et al., inventors of the present invention, have proposed a natural laminarization-related technique of delaying the boundary layer transition on a wing surface to reduce friction drag (see Patent Literature 1).

That technique uses: a process of setting an initial shape of a cross-sectional wing shape; a CFD analysis process of determining pressure distribution of a flow-field in the vicinity of the cross-sectional wing shape obtained; a transition analysis process of estimating a boundary layer transition position on a wing surface; a process of setting target pressure distributions for wing upper and lower surfaces based on the pressure distribution; and a CFD-based inverse problem design process including the CFD analysis process and a shape correction process "correcting the cross-sectional wing shape such that the pressure distribution obtained from the CFD analysis process converges on the target pressure distribution." Moreover, the technique is as follows: in such a CFD-based inverse problem design process, among the target pressure distributions, the wing upper surface target pressure distribution defines "a wing chordwise direction from a wing leading edge to a wing trailing edge" as a domain at each spanwise station, and moreover is provided by a functional type with parameters dependent on the spanwise station as coefficients; then the sensitivity of the wing upper surface boundary layer transition due to fluctuations in each of the parameter values of the parameters is analyzed by the transition analysis process; and an optimal combination of parameter values that delays the wing upper surface boundary layer transition the furthest rearward at a desired Reynolds number is determined by performing a search.

CITATION LIST

Patent Literature

Patent Literature 1: Japanese Patent No. 5747343

DISCLOSURE OF INVENTION

Technical Problem

The above-mentioned technique uses the CFD-based inverse problem design process of determining the cross-sectional wing shape on the basis of the pressure distribution of the wing surface. It is necessary to independently each of determine pressure distributions on the wing surfaces of the wing cross-sections such that components in an external streamline direction of the wing surface (boundary between a viscous region and a potential region) and a cross-flow direction perpendicular thereto in each wing cross-section taken in the wingspan direction are reduced in the vicinity of the leading edge. Moreover, if any part of the cross-sectional wing shapes corresponding to the determined pressure distributions has insufficient performance, it can adversely affect the whole pressure distribution.

Therefore, it is very difficult just to make a design.

Moreover, even if a suitable design can be made, it is difficult to manufacture wings of an actual aircraft because the leading-edge shape of the wing shape based on such a design result is sharper toward the wing tip. It is because there are problems of deterioration of the structural strength and reduction of the working accuracy in manufacturing the wing having the leading-edge shape shaper toward the wing tip.

Further, high temperature due to heat generated by air compression and viscous friction near a stagnation point at a wing tip end affects the strength and the like of its structure. In a case of an existing wing having a small radius of curvature, there is also a problem that the rigidity of the aircraft body is lowered due to that frictional heat.

In view of the above-mentioned circumstances, it is an object of the present invention to provide a wing achieving reduction of friction drag and easy to design and also easy to manufacture and an aircraft including such a wing.

Solution to Problem

As to the above-mentioned problem, owing to development of a transition point prediction method in recent years, the instability of the boundary layer can be analyzed in a numerical analysis manner. An ideal pressure distribution suitable for natural laminarization can be obtained by grasping a relationship between a pressure distribution and transition by using the transition point prediction method. The inventors of the present invention found an optimal distribution form by displaying a pressure distribution form as a function and searching for configurations of parameters thereof. In addition, the inventors of the present invention determined a characteristic shape which can reproduce that pressure distribution.

Specifically, a wing according to an embodiment of the present invention is a wing having a swept-back angle, which is configured such that a surface pressure (pressure distribution (Cp)) on an upper surface of a vicinity of a leading edge in a fluid increases from a wing root to a wing tip.

Typically, the wing only needs to be configured such that the surface pressure of the upper surface of the vicinity of the leading edge in the fluid, which is within a range of 0% to 5% from the leading edge in a wing chord direction, increases from the wing root to the wing tip.

Typically, the wing only needs to be configured such that a rising gradient of the surface pressure on the upper surface of the vicinity of the leading edge in the fluid is systematically gentler from the wing root to the wing tip.

Typically, the wing only needs to be configured such that a dimensionalized radius of curvature of the leading edge decreases from the wing root to the wing tip.

Typically, the surface pressure on the upper surface of the vicinity of the leading edge in the fluid is expressed by a function of Expression 1 below.

[Expression 1]

$$Cp(\xi, \eta) = \sum_{i=0}^{n} A_i(\eta) f_i(\xi, \eta) \quad \text{(Expression 1)}$$

$$\xi \equiv x/c,$$
$$\eta \equiv y/s$$
$$f_0(\xi, \eta) \equiv 1,$$
$$f_i(\xi, \eta) \equiv \exp[B_i(\eta)\xi^{p_i}] - 1, \, i = 1, \ldots, n-1$$
$$f_n(\xi, \eta) \equiv \xi^{p_n}$$

where n=5 in a case of a supersonic aircraft and n=7 in a case of a subsonic aircraft.

Typically, $B_2(\eta)$ of Expression 1 above is expressed by Expression 2 below.

[Expression 2]

$$B_2(\eta) = \left(\Lambda_{LE}(\eta) \sum_{i=0}^{2} \alpha_i \eta^i\right) \times \text{fudge factor} \quad \text{(Expression 2)}$$

where $\eta \equiv y/s$
$\Lambda_{LE} \equiv$ Swept-back Angle at $\eta$ station [rad]
fudge factor ≡ Fine adjustment factor
   for adjusting Re number effect and the
like. (used in range of [0, 1] considering case of
   size of actual aircraft with highly swept-
      back wing, high-Reynolds number as 1)
$\alpha_0 = -105000$
$\alpha_1 = 198000$
$\alpha_2 = -95000.$ The wing according to an aspect of the present invention is configured such that the non-dimensionalized radius of curvature of the leading edge increases from the wing root to the wing tip. Typically, the dimensionalized radius of curvature of the leading edge decreases from the wing root to the wing tip. In a case of the wing to be used for the supersonic aircraft, typically, in a range from the wing root to 0.2(y/s) in the wingspan direction, the dimensionalized radius of curvature increases from the wing root to the wing tip in the wing according to Patent Literature 1, while the dimensionalized radius of curvature decreases from the wing root to the wing tip also in that range the wing according to the embodiment of the present invention.

In the present invention, with the configuration in which the surface pressure on the upper surface of the vicinity of the leading edge in the fluid increases from the wing root to the wing tip, a flow in a direction opposite to that of the cross-flow component is induced by utilizing a difference between a rising pressure gradient at the wing root and a rising pressure gradient at the wing tip. In this manner, the cross-flow component can be reduced and the transition from the laminar flow to the turbulent flow can be suppressed. Moreover, an ideal pressure distribution suitable for natural laminarization is determined by grasping a relationship between a pressure distribution and transition by using a transition point prediction method, and its shape is also determined. Therefore, it is easy to make a design. Furthermore, its shape is adapted such that the non-dimensionalized radius of curvature of the leading edge typically increases from the wing root to the wing tip. Therefore, the leading-edge shape is not sharper toward the wing tip, and it is also easy to manufacture it.

The wing according to the present invention can be used for the supersonic aircraft and the subsonic aircraft.

The aircraft according to the embodiment of the present invention is a wing having a swept-back angle, which is configured such that a surface pressure on an upper surface of a vicinity of a leading edge in a fluid increases from a wing root to a wing tip. A shape as an aspect thereof is one having a wing configured such that a non-dimensionalized radius of curvature of the leading edge increases from the wing root to the wing tip. An aircraft as an aspect thereof is one having a wing configured such that the non-dimensionalized radius of curvature of the leading edge increases from the wing root to the wing tip.

Advantageous Effects of Invention

In accordance with the present invention, cross-flow components in an external streamline direction of a wing surface and in a direction perpendicular thereto are reduced in the vicinity of the leading edge, and the boundary layer transition is not easily induced in the vicinity of the leading edge. With this, the friction drag caused by the cross-flow instability can be reduced. Furthermore, it is easy to design and also easy to manufacture it.

MODE(S) FOR CARRYING OUT THE INVENTION

Hereinafter, an embodiment of the present invention will be described with reference to the drawings.

Figure 1:
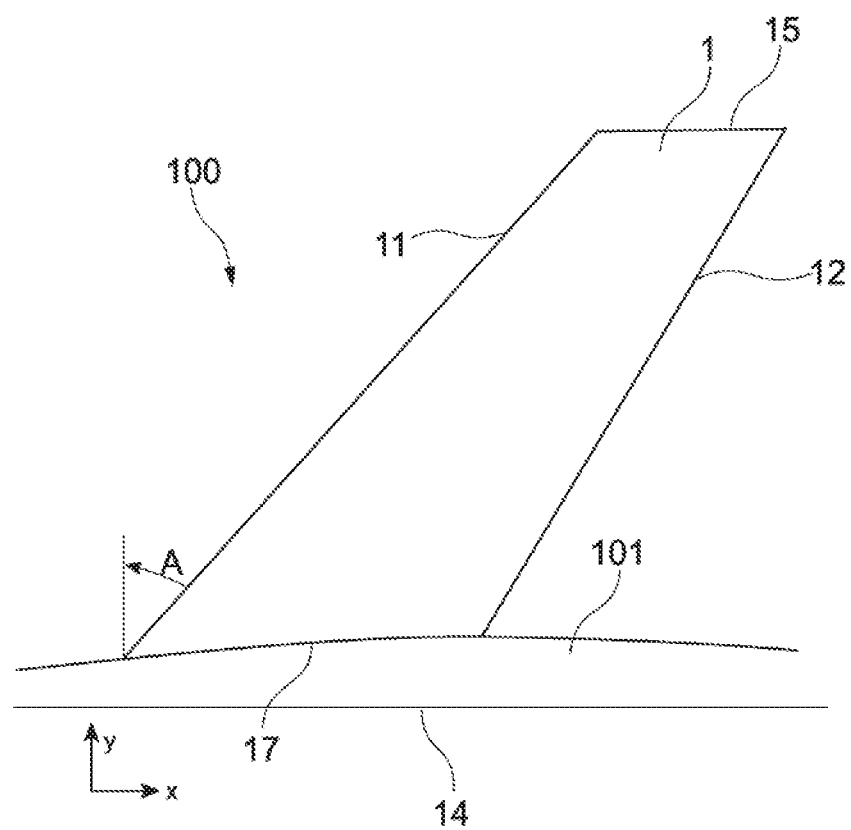
FIG. 1 A top view of a wing as a main wing of an aircraft according to an embodiment of the present invention.
Figure 2:
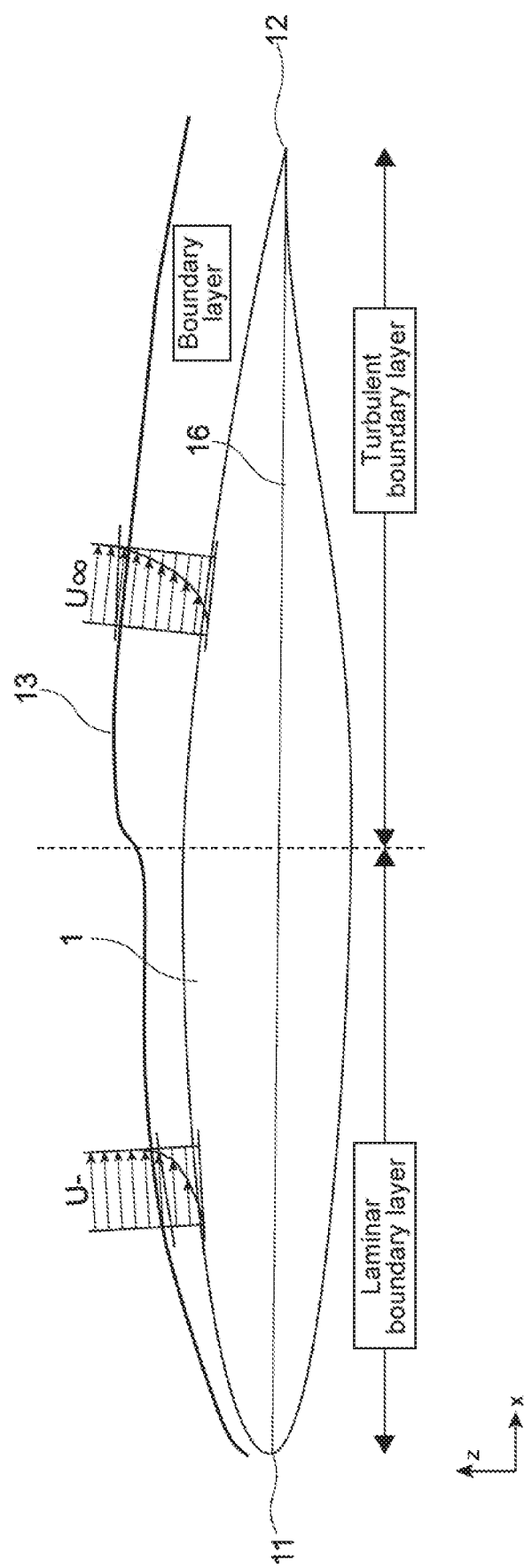
FIG. 2 A cross-sectional view of the wing shown in FIG. 1, which is taken at an arbitrary position.

FIGS. 1 and 2 are diagrams for describing a wing according to the embodiment of the present invention. FIG. 1 shows a top view of the wing as a main wing of an aircraft. FIG. 2 shows a cross-sectional view of the wing. FIG. 1 shows one of two main wings. FIG. 2 shows a vertical cross-sectional view of the wing shown in FIG. 1, which is taken at an arbitrary position in a wingspan direction.

As shown in FIG. 1, the wing 1 according to the embodiment of the present invention is typically used as a main wing of an aircraft 100. The reference sign 101 designates a fuselage of the aircraft 100. The aircraft 100 may be a supersonic aircraft or may be a subsonic aircraft. Moreover, the wing 1 is a swept-back wing having a swept-back angle A.

In FIGS. 1 and 2, the x-axis indicates an axis in a wing chord direction, the y-axis indicates an axis in a wingspan (span) direction, and the z-axis indicates an axis in a wing thickness direction.

The origin on the x-axis is a leading edge 11. The + direction of the x-axis is a direction from the leading edge 11 to a trailing edge 12. The origin on the y-axis is an aircraft axis 14 of the aircraft 100. The + direction of the y-axis is a direction from the aircraft axis 14 to a wing tip 15. The origin of the z-axis is a wing chord line 16 (FIG. 2). The + direction of the z-axis is a direction upward from the wing 1.

Moreover, in order to non-dimensionalize a position in the wing chord direction (x-direction), a position in the wingspan direction (y-direction), and a position in the wing thickness direction (z-direction) in the wing 1, those positions are each divided by a local wing chord length c of the wing 1 or a semi-span length s of the wing 1. The non-dimensionalized position (x/c) in the wing chord direction (x-direction), the non-dimensionalized position (y/s) in the wingspan direction (y-direction), and the non-dimensionalized position (z/c) in the wing thickness direction (z-direction) are defined.

In Case of Supersonic Aircraft

Hereinafter, an embodiment in a case where the present invention is applied to a supersonic aircraft will be described.

Pressure Distribution (Cp)

Figure 3:
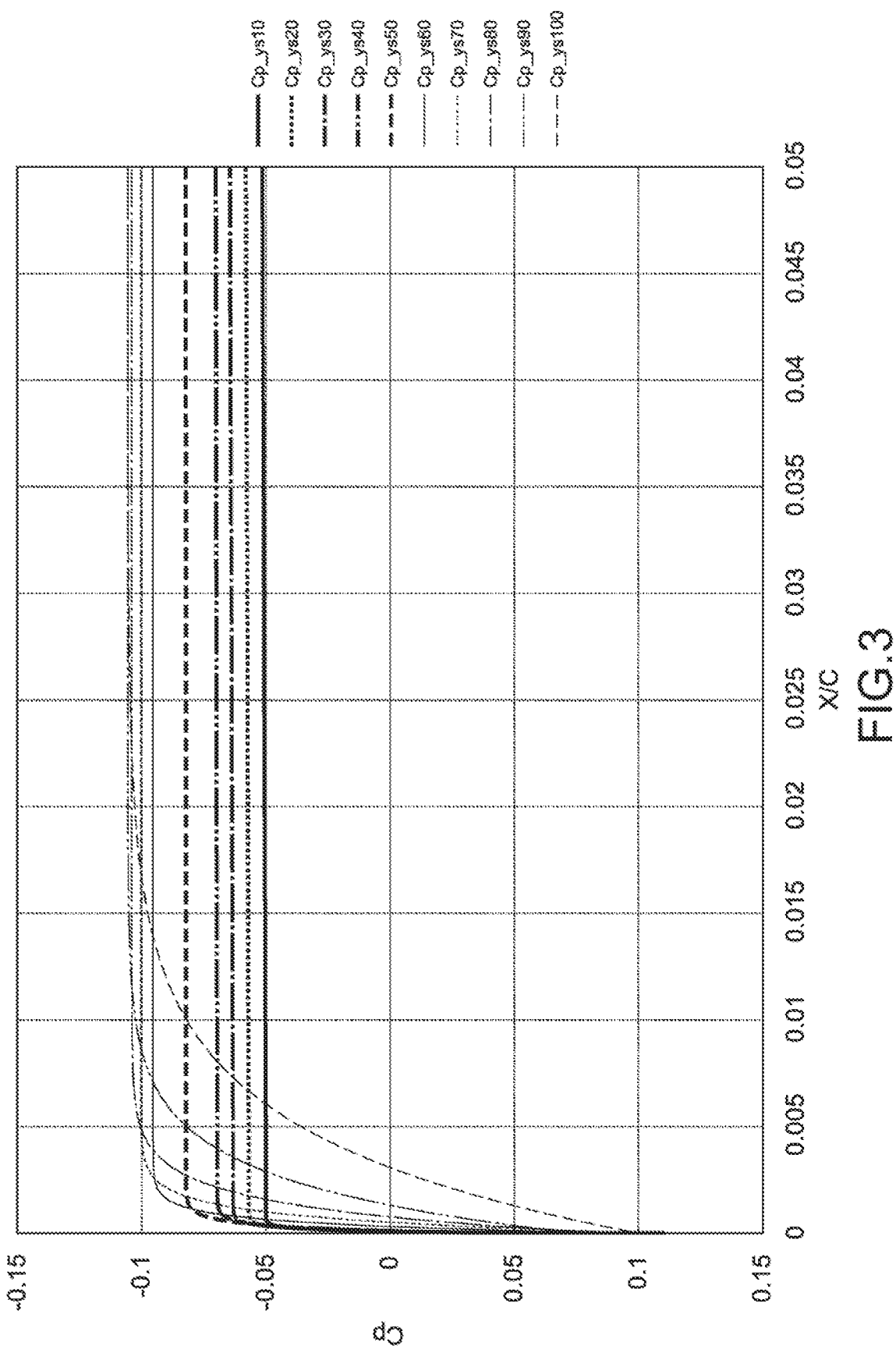
FIG. 3 A diagram showing pressure distributions (Cp) on an upper surface of the vicinity of a leading edge of a wing (supersonic aircraft) according to the embodiment of the present invention.

FIG. 3 is a diagram showing pressure distributions (Cp) on an upper surface of the vicinity of the leading edge 11 of the wing 1.

As shown in FIG. 3, the wing 1 is configured such that a surface pressure (pressure distribution (Cp)) on the upper surface of the vicinity of the leading edge 11 in a fluid increases from a wing root 17 to the wing tip 15. Here, the term "the vicinity of the leading edge 11" typically refers to a range of 0% to 5% from the leading edge to at least the wing chord length. The wing 1 only needs to be configured such that the surface pressure in the fluid at least within that range increases from the wing root 17 to the wing tip 15. In FIG. 3, the horizontal axis represents the non-dimensionalized position in the wing chord direction (x-direction) and the vertical axis represents the pressure distribution (Cp).

Here, Cp_ys10 represents a pressure distribution (Cp) based on the non-dimensionalized position in the wing chord direction (x-direction) in a case where the non-dimensionalized position (y/s) in the wingspan direction (y-direction) is a position of 10%. The same applies to the following symbols, and Cp_ys20 represents a pressure distribution (Cp) based on the non-dimensionalized position in the wing chord direction (x-direction) in a case where the non-dimensionalized position (y/s) in the wingspan direction (y-direction) is a position of 20%.

In those pressure distributions in the vicinity of the leading edge 11, the rising gradients are made systematically gentler from Cp_ys10 to Cp_ys100, that is, from the wing root 17 to the wing tip 15 of the upper surface of the wing 1. As a result, the wing 1 is configured such that the pressure distribution (Cp) on the upper surface of the vicinity of the leading edge 11 increases from the wing root 17 to the wing tip 15.

Figure 4:
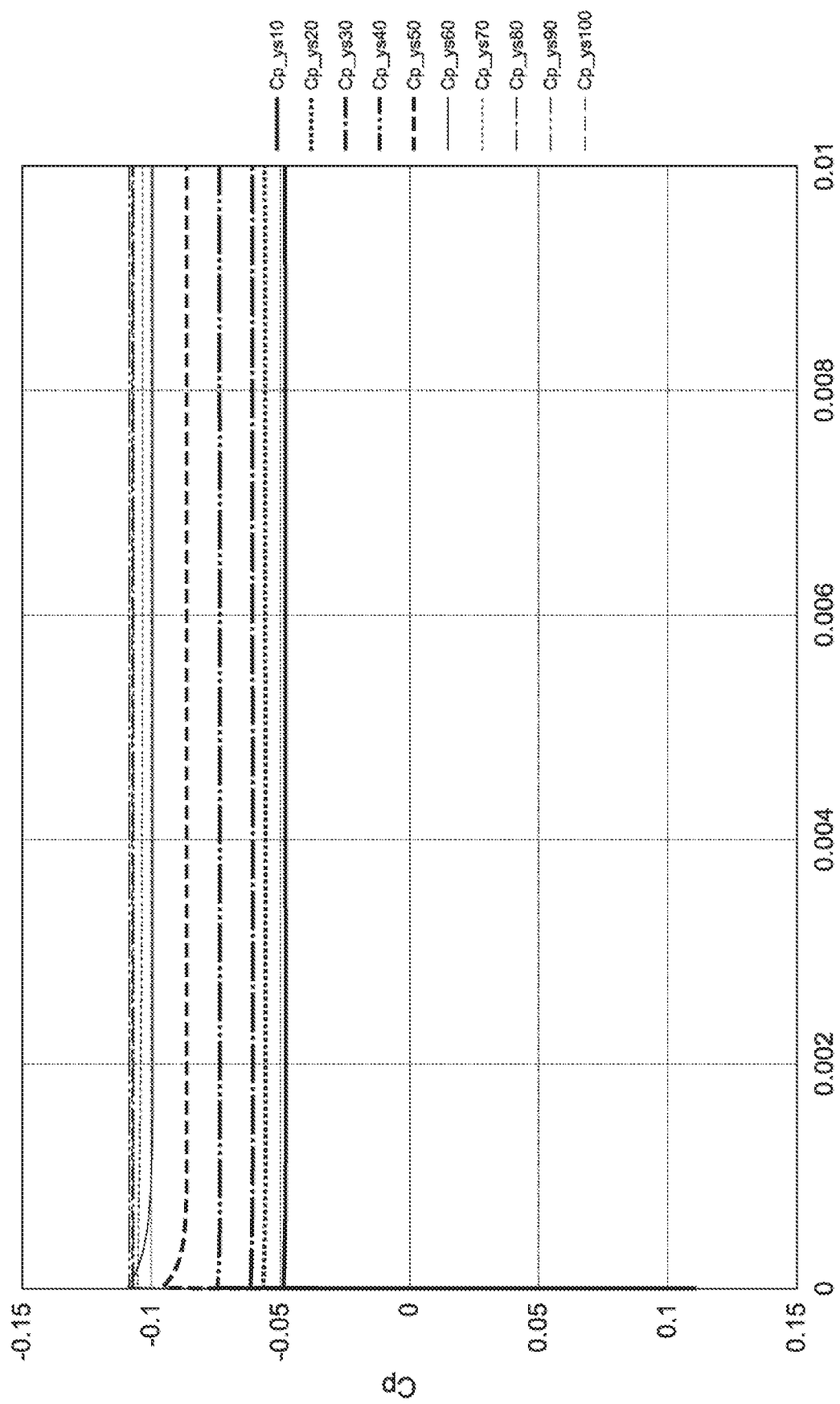
FIG. 4 A diagram showing pressure distributions (Cp) on the upper surface of the vicinity of the leading edge of the wing (supersonic aircraft) according to Patent Literature 1.

FIG. 4 shows similar pressure distributions (Cp) according to Patent Literature 1 as an reference example. Those pressure distributions (Cp) have substantially the same gradients at all positions in the wingspan (span) direction. The wing 1 according to the present invention is thus clearly different from the pressure distributions according to Patent Literature 1 in this point.

The pressure distribution (Cp) on the upper surface of the vicinity of the leading edge 11 of the wing 1, which are shown in FIG. 3, can be typically expressed by the following function.

[Expression 1]

$$Cp(\xi, \eta) = \sum_{i=0}^{n} A_i(\eta) f_i(\xi, \eta) \quad \text{(Expression 1)}$$

$$\xi \equiv x/c,$$
$$\eta \equiv y/s$$
$$f_0(\xi, \eta) \equiv 1,$$
$$f_i(\xi, \eta) \equiv \exp[B_i(\eta)\xi^{P_i}] - 1, i = 1, \ldots, n-1$$
$$f_n(\xi, \eta) \equiv \xi^{P_n}$$

where n=5 in a case of the supersonic aircraft and n=7 in a case of the subsonic aircraft.

In that function, the rising gradients of the vicinity of the leading edge 11 in the wingspan (span) direction can be typically determined in accordance with the following relational expression.

[Expression 2]

$$B_2(\eta) = \left( \Lambda_{LE}(\eta) \sum_{i=0}^{2} \alpha_i \eta^i \right) \times \text{fudge factor} \quad \text{(Expression 2)}$$

where $\eta \equiv y/s$
$\Lambda_{LE} \equiv$ Swept-back Angle at $\eta$ station [rad]
fudge factor $\equiv$ Fine adjustment factor
  for adjusting Re number effect and the
  like. (used in range of [0, 1] considering case of
  size of actual aircraft with highly swept-
    back wing, high-Reynolds number as 1)
$\alpha_0 = -105000$
$\alpha_1 = 198000$
$\alpha_2 = -95000$ Airfoil Regarding the airfoil of the wing 1, although the dimensionalized radius of curvature of the leading edge 11 typically decreases from the wing root 17 to the wing tip 15, it is configured such that the non-dimensionalized radius of curvature of the leading edge 11 increases from the wing root 17 to the wing tip 15.

Figure 5:
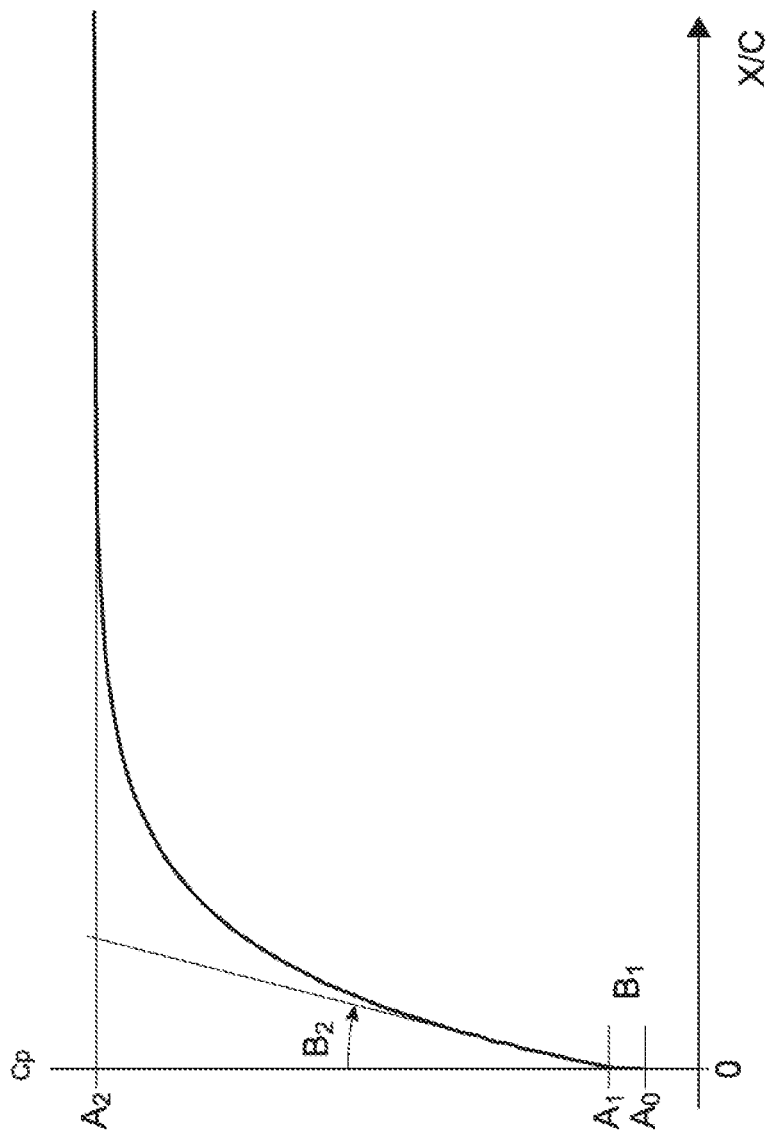
FIG. 5 A diagram for describing parameters of a pressure distribution (Cp) according to the embodiment of the present invention.

Such a shape can be obtained by using the CFD-based inverse problem design process of determining the cross-sectional wing shape on the basis of the above-mentioned pressure distributions (Cp) of the wing 1, which has been described above. The CFD-based inverse problem design process typically includes: a process of setting an initial shape of a cross-sectional wing shape; a CFD analysis process of determining pressure distribution of a flow-field in the vicinity of the cross-sectional wing shape obtained; a transition analysis process of estimating a boundary layer transition position on a wing surface; a process of setting target pressure distributions for wing upper and lower surfaces based on the pressure distribution; and a CFD-based inverse problem design process including the CFD analysis process and a shape correction process "correcting the cross-sectional wing shape such that the pressure distribution obtained from the CFD analysis process converges on the target pressure distribution." The CFD-based inverse problem design process is described in detail in Patent Literature 1 (Japanese Patent No. 5747343). The contents thereof also fall within the scope of disclosure of the present invention. A more specific design example will be described with reference to FIG. 5. FIG. 5 shows the leading edge of the wing 1 in an enlarged state. Here, a design is made by determining parameters as follows at positions $A_0$ to $B_2$ shown in FIG. 5.

$A_0$: pressure at leading edge (use Cp distribution for initial shape)

$A_1$: rising pressure value at each spanwise station of leading edge portion $A_2$: Set to value close to average value of minimum pressure level at each spanwise station $A_3$ to An: Adjust Cp distribution $B_1$: Make negative values with larger absolute values $B_2$: Make negative values with absolute values gradually smaller at each spanwise station from wing root to the wing tip Important parameters of the vicinity of the leading edge of the wing 1 can be thus determined. The airfoil can be determined. The wing 1 having reduced friction drag can be easily designed.

With this, the wing 1 is configured such that the surface pressure of the vicinity of the leading edge 11 of the surface in the fluid increases from the wing root 17 to the wing tip 15. The airfoil of the wing 1 as an aspect thereof is typically configured such that the dimensionalized radius of curvature of the leading edge 11 decreases from the wing root 17 to the wing tip 15 while the non-dimensionalized radius of curvature of the leading edge 11 increases from the wing root 17 to the wing tip 15.

Figure 6:
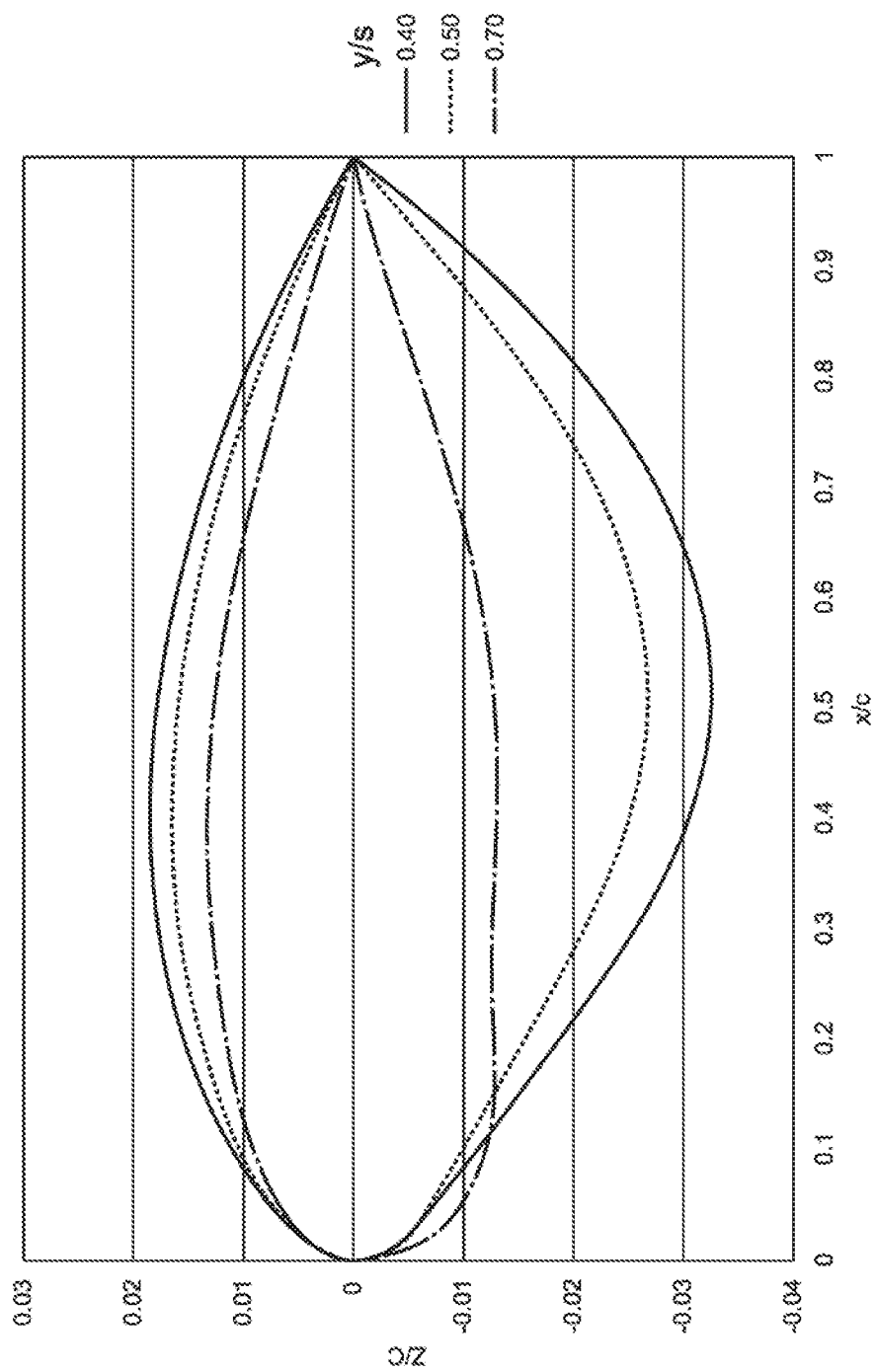
FIG. 6 A diagram showing a cross-sectional shape of an airfoil (supersonic aircraft) of the wing according to the embodiment of the present invention, which is non-dimensionalized.
Figure 7:
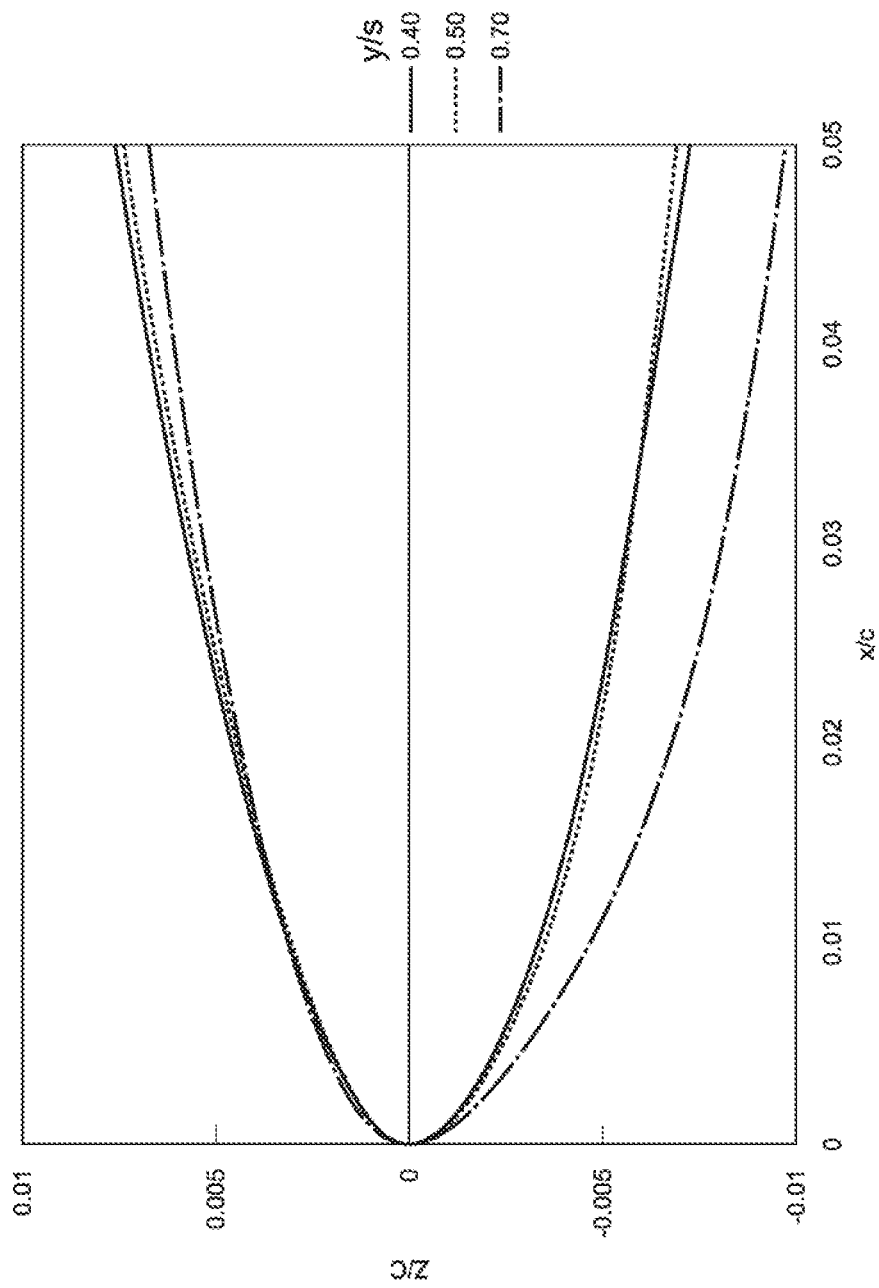
FIG. 7 An enlarged view of the vicinity of the leading edge of the cross-sectional shape shown in FIG. 6.

FIGS. 6 and 7 show a shape example of the airfoil of such a wing 1. FIG. 6 shows a non-dimensionalized cross-sectional shape of the wing 1.

FIG. 7 shows an enlarged view of the vicinity of the leading edge 11 of FIG. 6.

Figure 8:
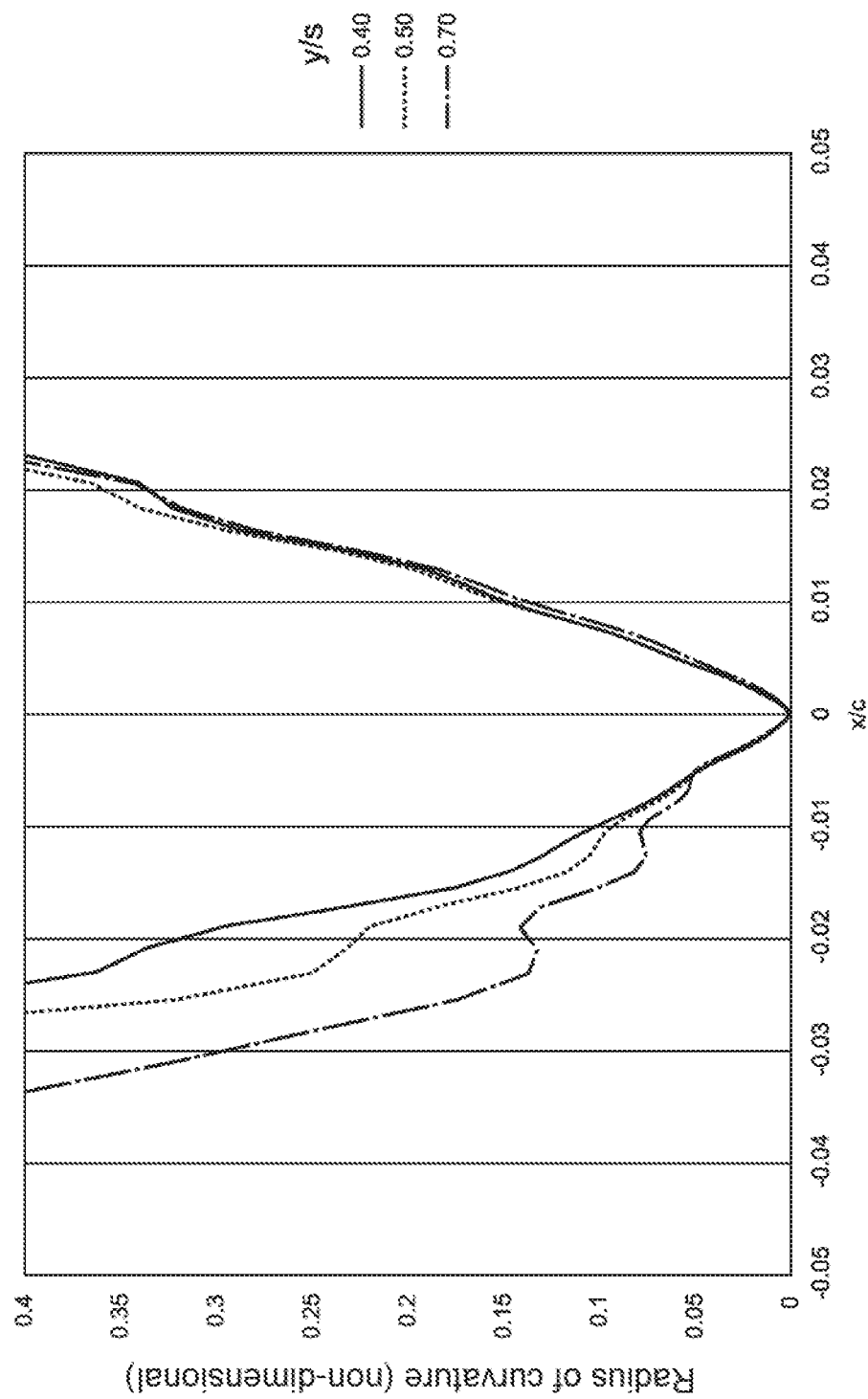
FIG. 8 A graph showing a non-dimensional radius of curvature of the vicinity of the leading edge including both of an upper surface and a lower surface of the wing (supersonic aircraft) according to the embodiment of the present invention.
Figure 9:
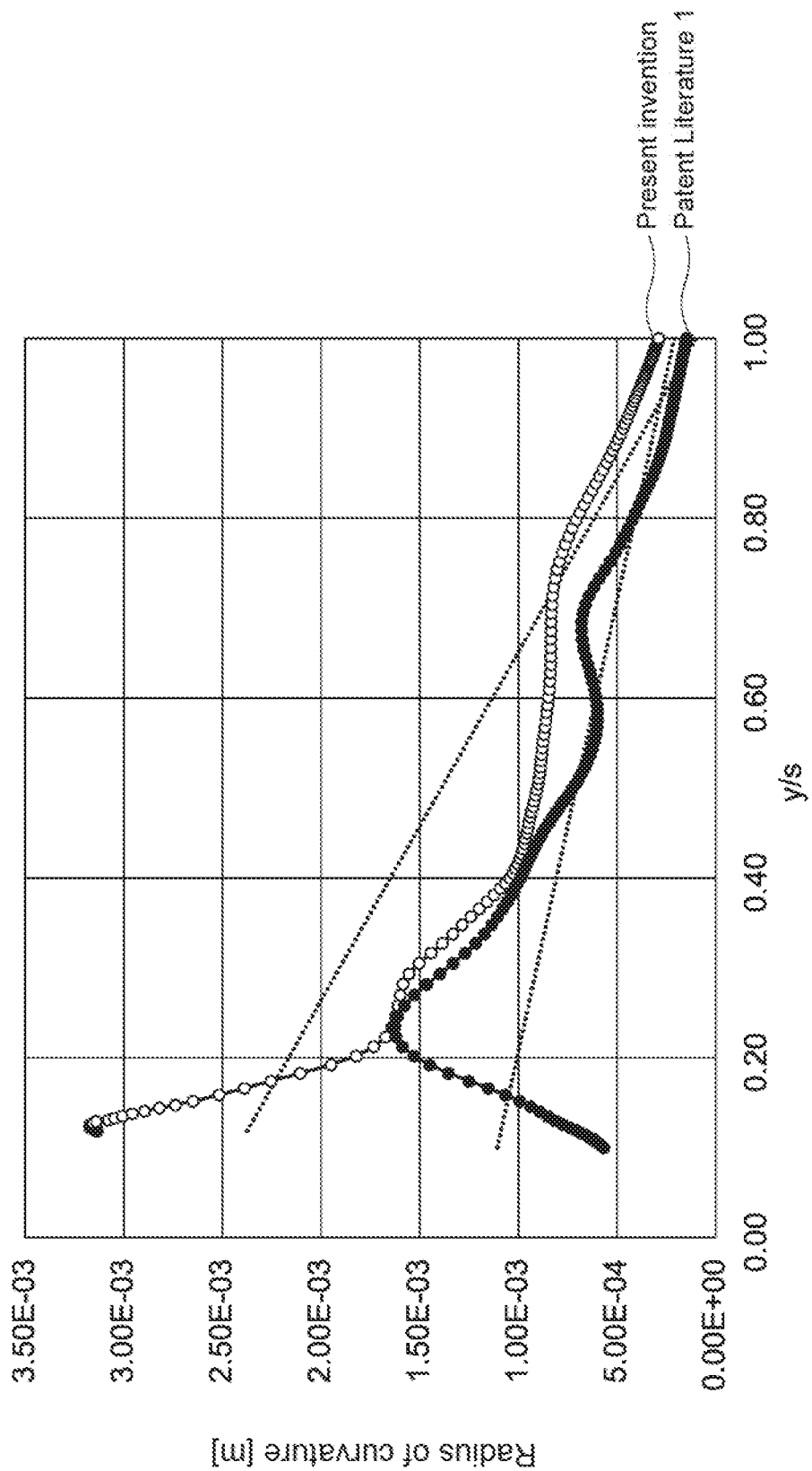
FIG. 9 A graph showing a dimensional radius of curvature of the leading edge of the wing (supersonic aircraft) according to the embodiment of the present invention.
Figure 10:
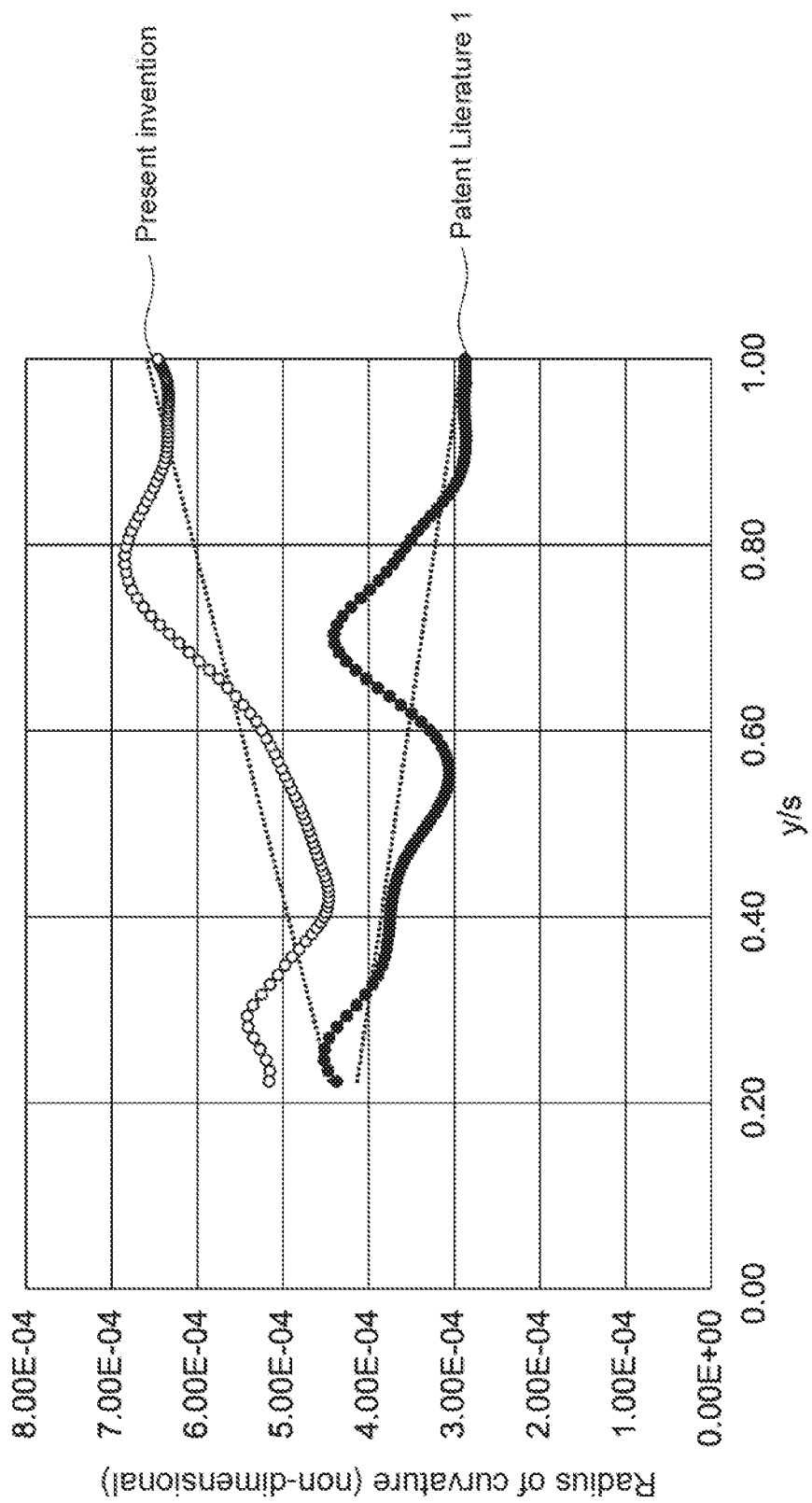
FIG. 10 A graph showing a non-dimensionalized radius of curvature of the leading edge of the wing (supersonic aircraft) according to the embodiment of the present invention.

FIGS. 8, 9, and 10 each show a radius of curvature of the leading edge of the wing 1 shown in FIGS. 6 and 7. FIG. 8 shows a non-dimensional radius of curvature of the vicinity of the leading edge 11 including both of an upper surface and a lower surface (x/c+ is the upper surface and − is the lower surface). FIG. 9 shows a dimensional radius of curvature (m) of the leading edge 11. FIG. 10 shows a radius of curvature non-dimensionalized with the local wing chord length of the leading edge 11. Moreover, in either case, the position of the wingspan (span) direction (y-direction) is non-dimensionalized (y/s). It should be noted that in FIGS. 9 and 10, the open circle (○) represents the radius of curvature of the leading edge of the wing 1 according to the present invention and the filled circle (●) represents the radius of curvature of the leading edge of the wing according to Patent Literature 1 as an reference example.

As shown in FIG. 9, as the dimensional radius of curvature of the leading edge of the wing 1 according to the present invention is compared to that of Patent Literature 1, the radius of curvature decreases from the wing root to the wing tip in the both cases at positions in the wingspan (span) direction which excludes the vicinity of the wing root (range of y/s=approximately 0 to 0.02). However, as can be seen from FIG. 10, as the non-dimensional radius of curvature of the leading edge of the wing 1 according to the present invention is compared to that of Patent Literature 1, the non-dimensional radius of curvature of the leading edge of Patent Literature 1 decreases from the wing root to the wing tip while the non-dimensional radius of curvature of the leading edge 11 of the wing 1 according to the present invention increases from the wing root 17 to the wing tip 15. The wing 1 according to the present invention is thus clearly different from the airfoil according to Patent Literature 1 in this point.

Actions and Effects

The above-mentioned wing 1 is configured such that the rising gradient of the pressure distribution (Cp) on the upper surface of the vicinity of the leading edge 11 is made systematically gentler from the wing root to the wing tip. With this, the above-mentioned wing 1 is configured such that the pressure distribution (Cp) on the upper surface of the vicinity of the leading edge 11 increases from the wing root 17 to the wing tip 15. A cross-flow component of an external streamline of the surface of the wing 1 is thus reduced in the vicinity of the leading edge 11. The boundary layer transition is not easily induced in the vicinity of the leading edge 11.

Drag which acts on an object moving through a fluid is classified into friction drag, induced drag, and wave drag (see FIG. 8 of Patent Literature 1).

The friction drag depends on state of a flow in the boundary layer. In a case of a laminar boundary layer, the friction drag is small in comparison with a case of a turbulent boundary layer (boundary layer stability theory: see FIG. 9 of Patent Literature 1).

Considering an aircraft as an example, maintaining a flow around an aircraft body during a flight as a laminar flow contributes to reduction of friction drag (see the laminar boundary layer and the turbulent boundary layer in FIG. 2).

Although laminarization of an aircraft body such as a wing is thus desirable, the flow around the aircraft body transitions from the laminar flow to the turbulent flow, depending on a flight condition (see FIG. 8 of Patent Literature 1).

Aerodynamic phenomena which can cause the boundary laminar flow to transition from the laminar flow to the turbulent flow are classified into two phenomena. One is Tollmien-Schichting (T-S) instability and the other is cross-flow (C-F) instability (see FIG. 10 of Patent Literature 1).

The transition due to the C-F instability is a dominant factor which can cause transition of an object shape (wing) having a large swept-back angle.

When a cross-flow velocity component is larger with respect to a direction of a boundary layer outer edge flow, the C-F instability remarkably develops, which causes transition of the boundary layer from the laminar flow to the turbulent flow.

Figure 11:
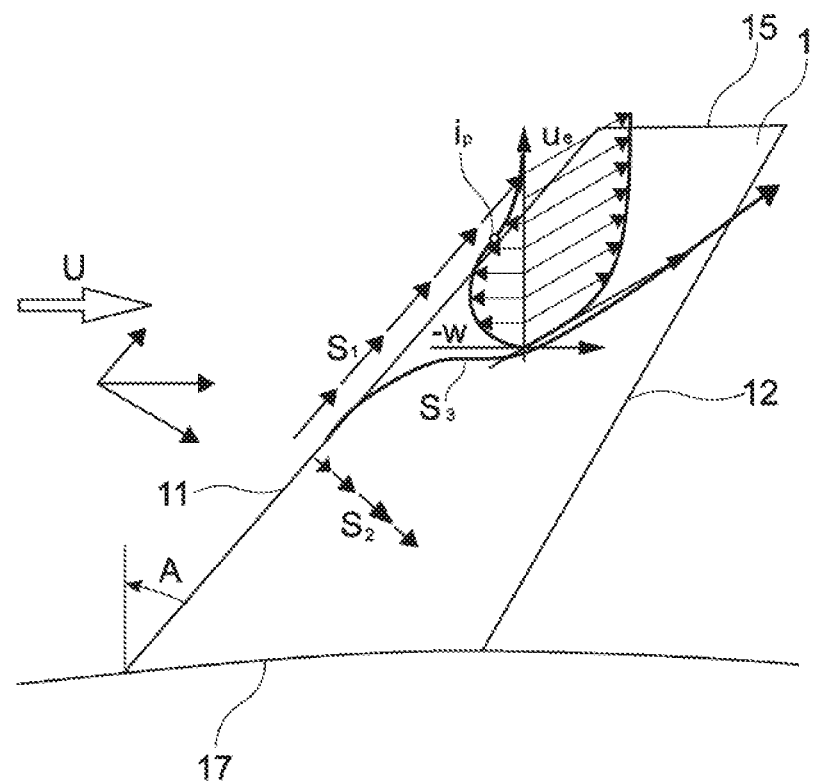
FIG. 11 A diagram for describing cross-flow instability of the wing.
Figure 12:
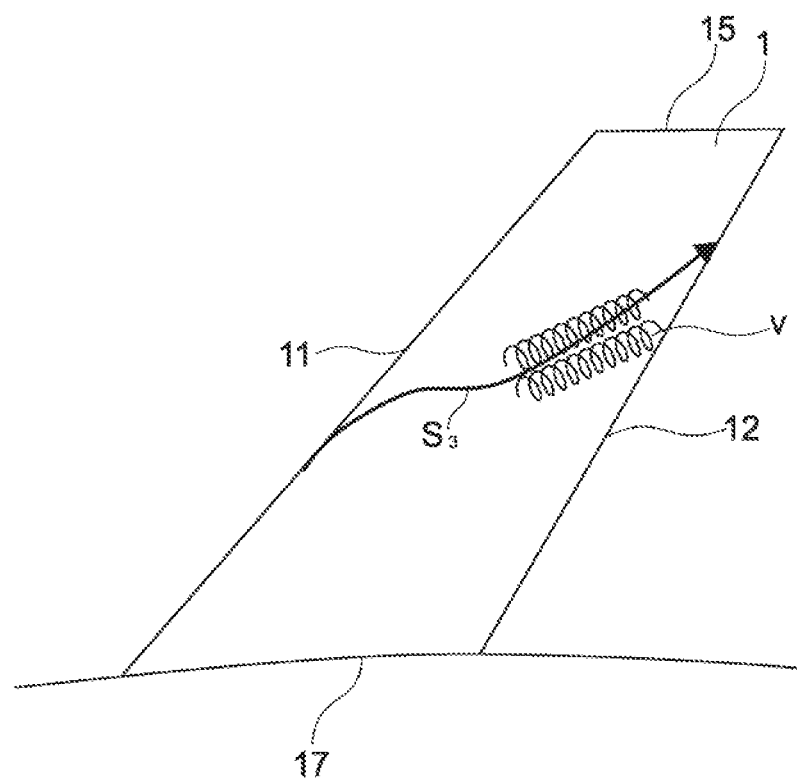
FIG. 12 A diagram for describing generation of a longitudinal vortex-shaped flow due to the cross-flow instability of the wing and transition from a laminar flow to a turbulent flow.

That is, as shown in FIG. 11, in a case where the wing 1 has a swept-back angle A, a leading-edge parallel component $S_1$ of a main stream is not affected by influence of a pressure gradient caused by the wing cross-section while a leading-edge orthogonal component $S_2$ is affected by the influence of the pressure gradient caused by the wing cross-section. Therefore, an external streamline (stream line at a boundary layer upper end) $u_e$ bends (reference sign $S_3$). A velocity component perpendicular to the stream line, that is, a cross-flow component w is generated due to bend of the external streamline $u_e$. The cross-flow component w has an inflection point $i_p$. When the velocity component has the inflection point, the flow is unstable in accordance with Rayleigh's inflection point theorem. That instability will be referred to as cross-flow instability. Then, as shown in FIG. 12, a longitudinal vortex-shaped flow v approximately parallel to the external streamline $u_e$ due to that cross-flow instability is generated, and it transitions from the laminar flow to the turbulent flow.

The wing 1 according to the present invention is configured such that the pressure distribution (Cp) on the upper surface of the vicinity of the leading edge 11 increases from the wing root 17 to the wing tip 15. Therefore, there is a difference between a rising pressure gradient at the wing root 17 and a rising pressure gradient at the wing tip 15. Then, by inducing a flow in a direction opposite to the cross-flow component w by utilizing this difference (difference due to the increase from the wing root 17 to the wing tip 15), the cross-flow component w is reduced, and the transition from the laminar flow to the turbulent flow, which is caused by the C-F instability, can be suppressed. With this, the friction drag caused by the C-F instability can be reduced.

Figure 13:
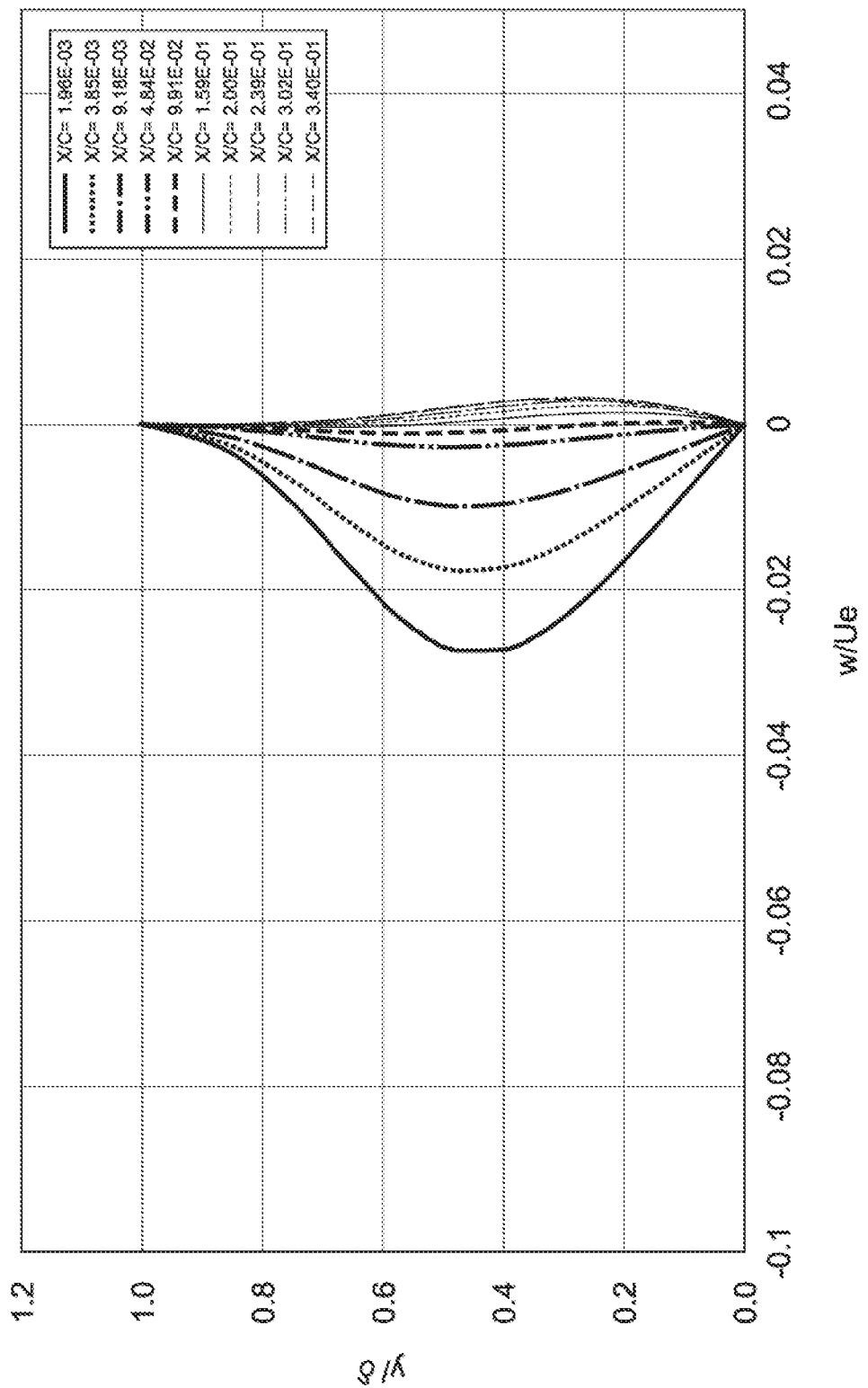
FIG. 13 A graph showing a profile of a pressure distribution associated with a cross-flow component of the wing (supersonic aircraft) according to the embodiment of the present invention.
Figure 14:
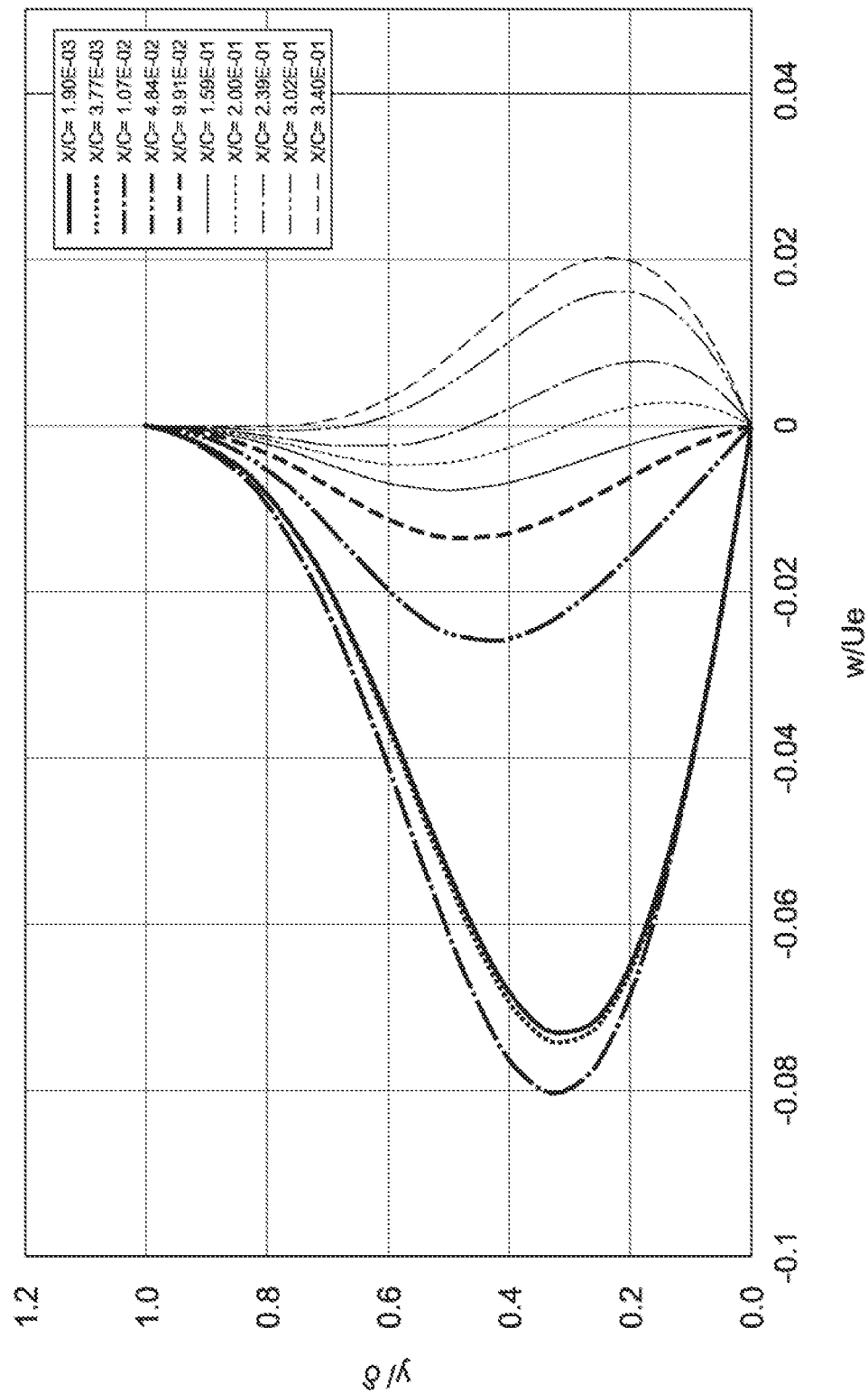
FIG. 14 A graph showing a profile of a pressure distribution associated with a cross-flow component of the wing (supersonic aircraft) according to Patent Literature 1.

FIG. 13 is a graph showing a profile of a pressure distribution associated with a cross-flow component of the wing 1 according to the embodiment of the present invention. FIG. 14 shows a profile of a pressure distribution associated with a cross-flow component of the wing according to Patent Literature 1 as an reference example. The both are the profile of the pressure distribution at a position of (y/s)=0.3 in the wingspan direction. In those figures, $\delta$ of y/$\delta$ of the vertical axis is a thickness of the boundary layer and is a distance between the boundary layer, which is shown as a line dividing a flow above the wing cross-section shown in FIG. 2 into upper and lower parts, and the wing surface.

As can be seen from those figures, in the wing 1 according to the present invention, the ratio of the cross-flow component w to the external streamline $u_e$ ($w/u_e$) is smaller in the vicinity of the leading edge 11 of the wing 1 as compared to the wing according to Patent Literature 1 and the cross-flow component w is suppressed.

Figure 15:
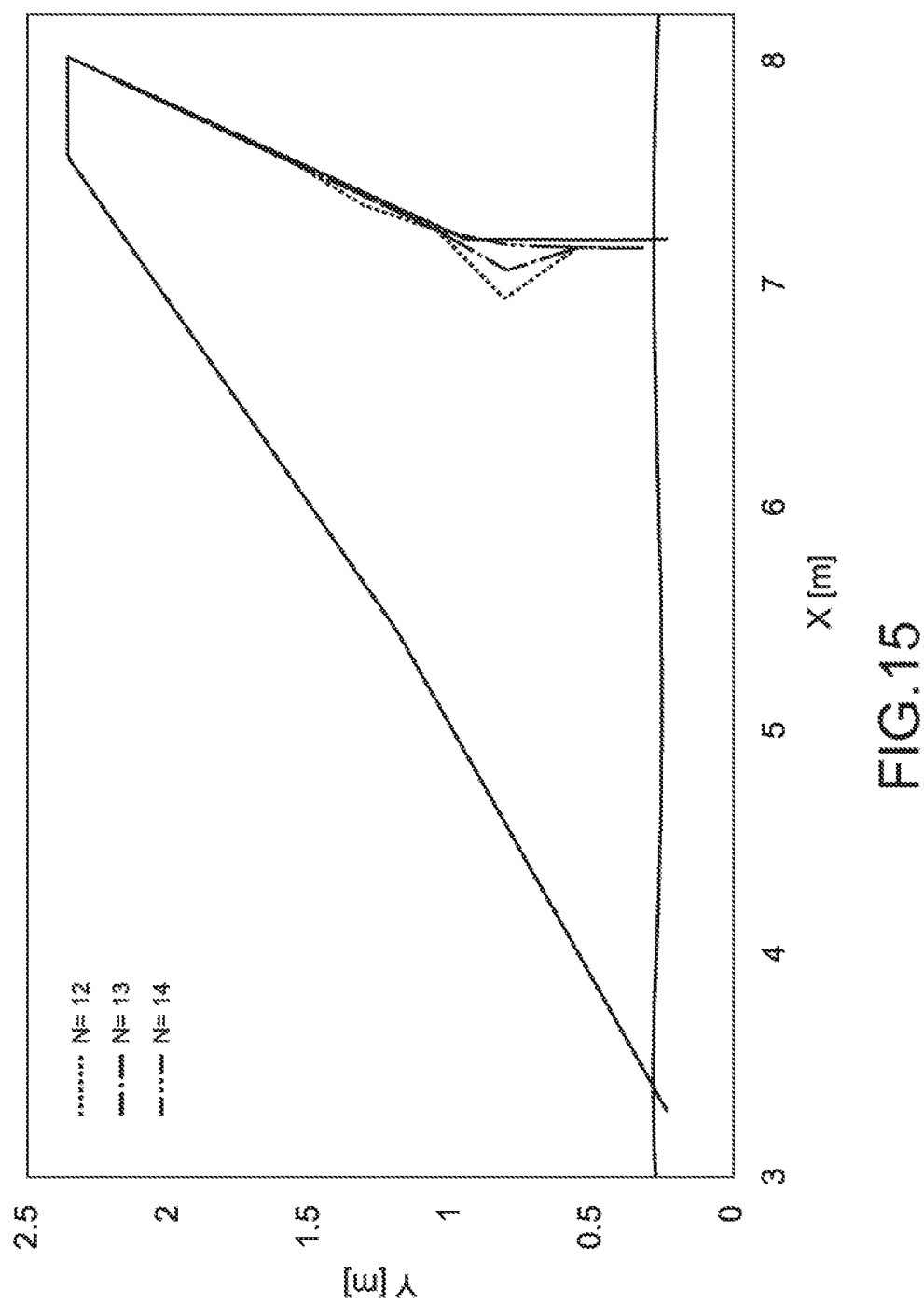
FIG. 15 A graph showing a transition point map of transition analysis results in the wing (supersonic aircraft) according to the embodiment of the present invention.
Figure 16:
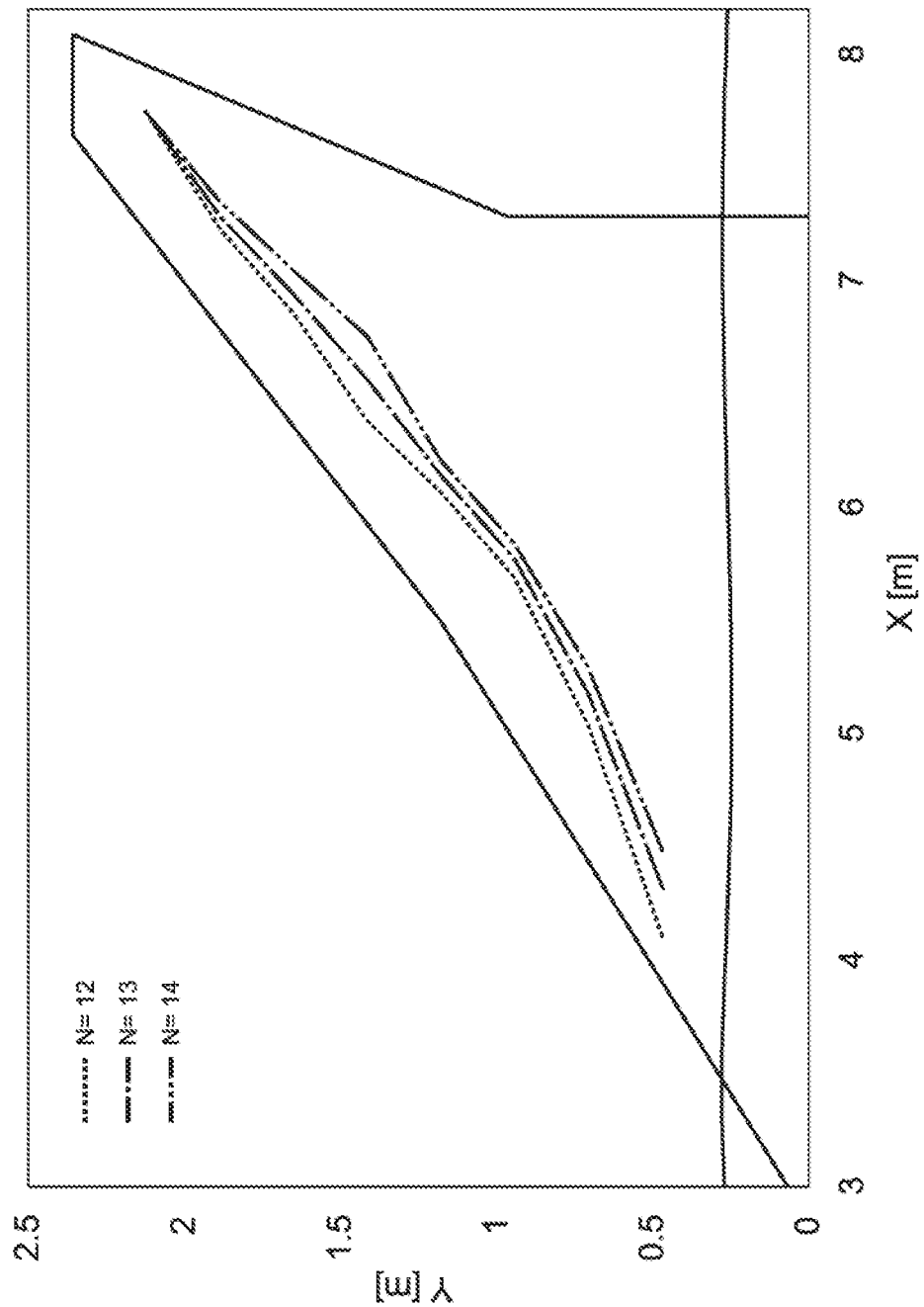
FIG. 16 A graph showing a transition point map of transition analysis results in the wing (supersonic aircraft) according to Patent Literature 1.

FIG. 15 is a graph showing a transition point map of transition analysis results in the wing 1 according to the embodiment of the present invention. FIG. 16 shows a transition point map of transition analysis results in the wing according to Patent Literature 1 as an reference example. Those graphs show a dimensional wing as viewed from the upper surface. In those figures, N is an amplification factor of unstable waves (wavy fluctuations due to the cross-flow instability) which introduce the transition process of the boundary layer from the laminar flow to the turbulent flow, and a specific value of N, for example, 12, 13, or 14 is a transition position depending on velocity of flow, test conditions, surface roughness, and the like.

As can be seen from those figures, in the wing 1 according to the present invention, the transition position is moved to a downstream side of the wing and a laminar flow region is wider as compared to the wing according to Patent Literature 1.

In Case of Subsonic Aircraft

The present invention can be applied not only to the supersonic aircraft but also to the subsonic aircraft.

Pressure Distribution (Cp)

Figure 17:
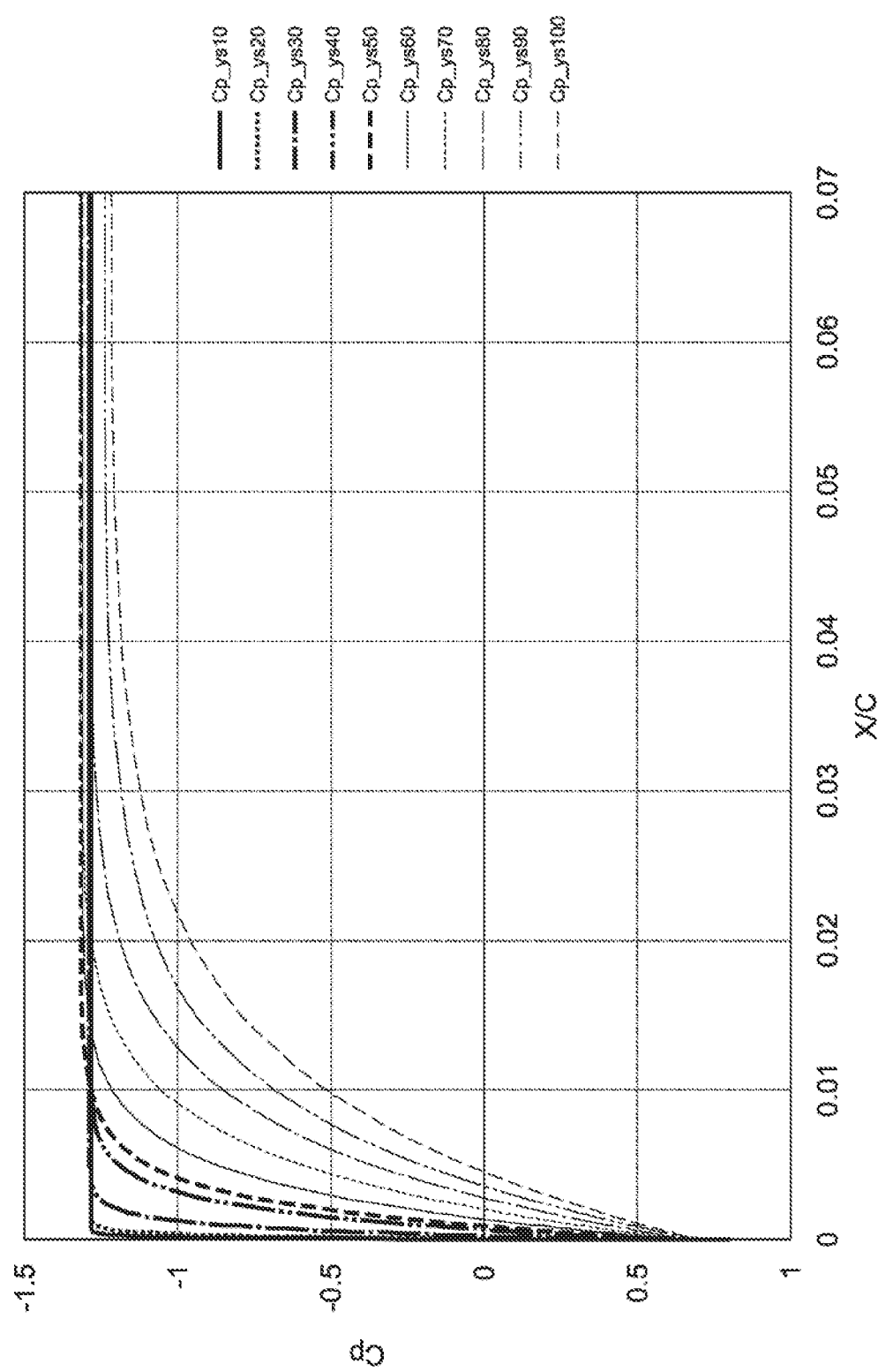
FIG. 17 A diagram showing pressure distributions (Cp) on an upper surface of the vicinity of a leading edge of a wing (subsonic aircraft) according to the embodiment of the present invention.

FIG. 17 is a diagram showing pressure distributions (Cp) in an upper surface of the vicinity of a leading edge 11 of a wing 1 of a subsonic aircraft.

As shown in FIG. 17, as in the supersonic aircraft, the wing 1 of the subsonic aircraft is configured such that the pressure distribution (Cp) on the upper surface of the vicinity of the leading edge 11 increases from a wing root 17 to a wing tip 15.

In those pressure distributions in the vicinity of the leading edge 11, the rising gradients are made systematically gentler from Cp_ys10 to Cp_ys100, that is, from the wing root 17 to the wing tip 15 of the upper surface of the wing 1. That is, the wing 1 is configured such that the pressure distribution (Cp) on the upper surface of the vicinity of the leading edge 11 increases from the wing root 17 to the wing tip 15.

Figure 18:
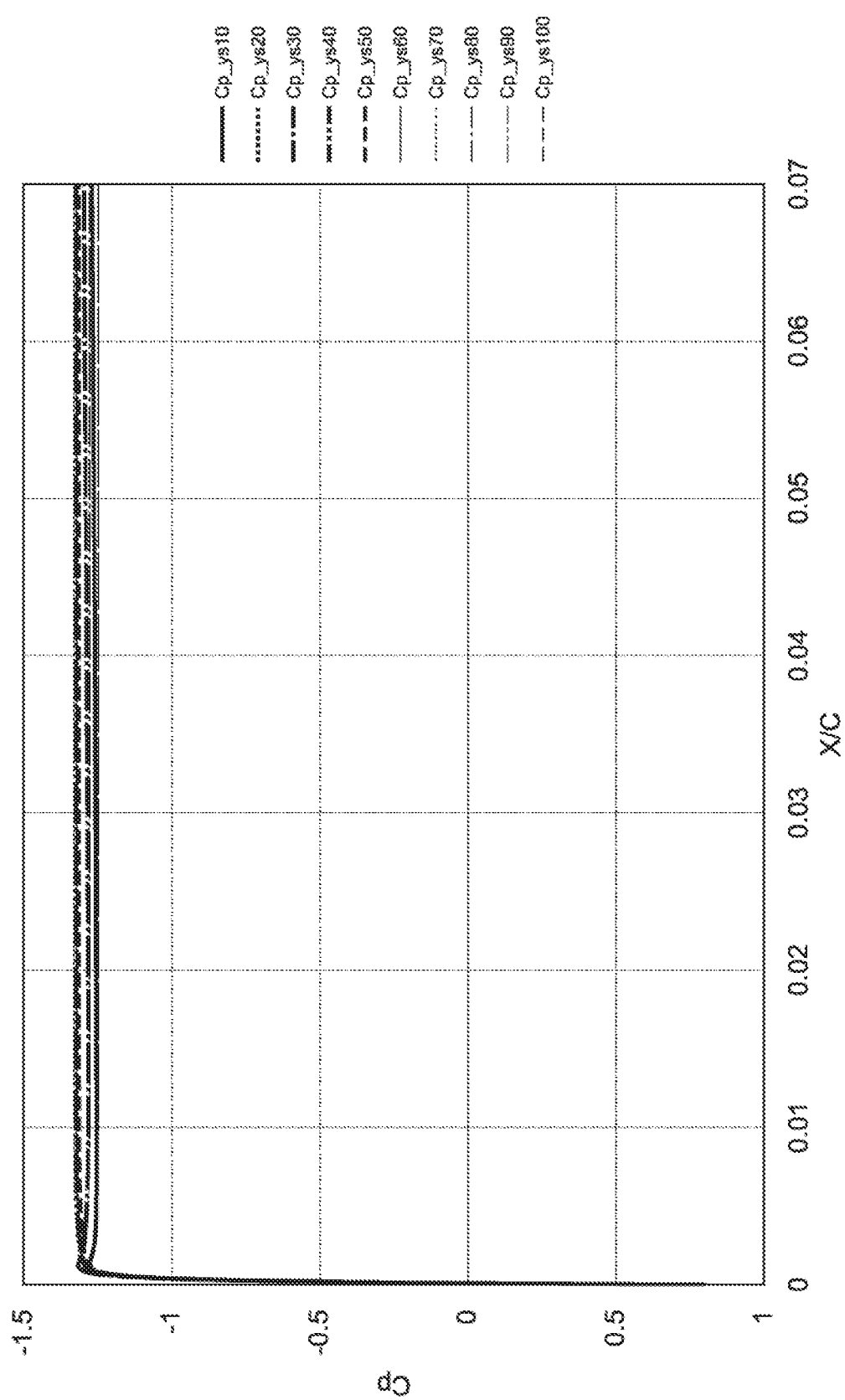
FIG. 18 A diagram showing pressure distributions (Cp) on an upper surface of the vicinity of a leading edge of a wing (subsonic aircraft) according to Patent Literature 1.

FIG. 18 shows similar pressure distributions (Cp) according to Patent Literature 1 as an reference example. Those pressure distributions (Cp) have substantially the same gradients at all positions in the wingspan (span) direction. The wing 1 of the subsonic aircraft according to the present invention is thus clearly different from the pressure distributions (Cp) according to Patent Literature 1 in this point.

The pressure distribution (Cp) on the upper surface of the vicinity of the leading edge 11 of the wing 1, which are shown in FIG. 17 can be typically expressed as n=7 in the function shown in Expression 1 above. Moreover, the rising gradients of the vicinity of the leading edge 11 in the wingspan (span) direction in that function can be typically determined in accordance with the relational expression shown in Expression 2.

Airfoil

As in the supersonic aircraft, the airfoil of the wing 1 of the subsonic aircraft is typically configured such that the dimensionalized radius of curvature of the leading edge 11 decreases from the wing root 17 to the wing tip 15 while the non-dimensionalized radius of curvature of the leading edge 11 increases from the wing root 17 to the wing tip 15.

Figure 19:
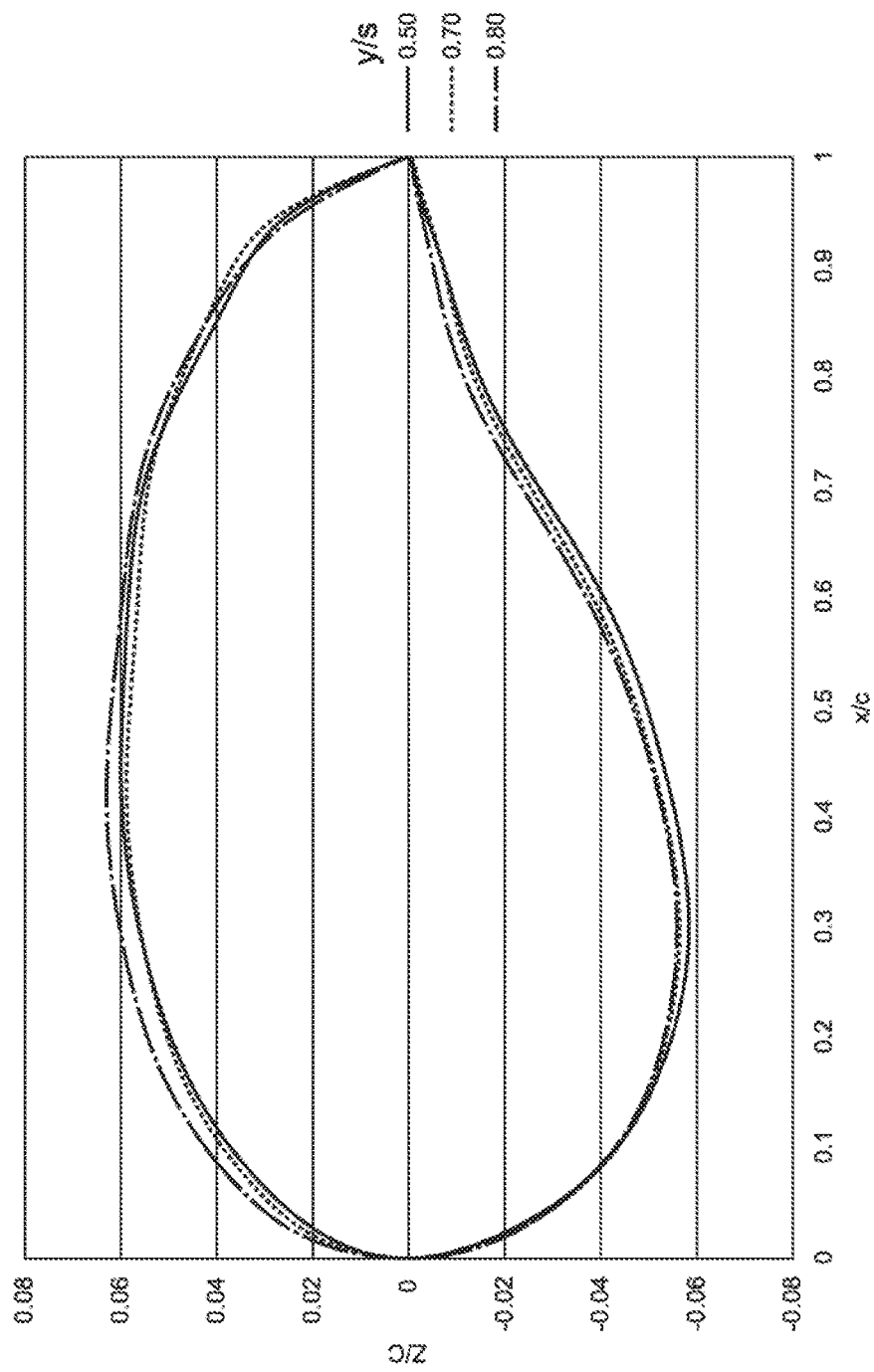
FIG. 19 A diagram showing a cross-sectional shape of an airfoil (subsonic aircraft) of a wing according to the embodiment of the present invention, which is non-dimensionalized.
Figure 20:
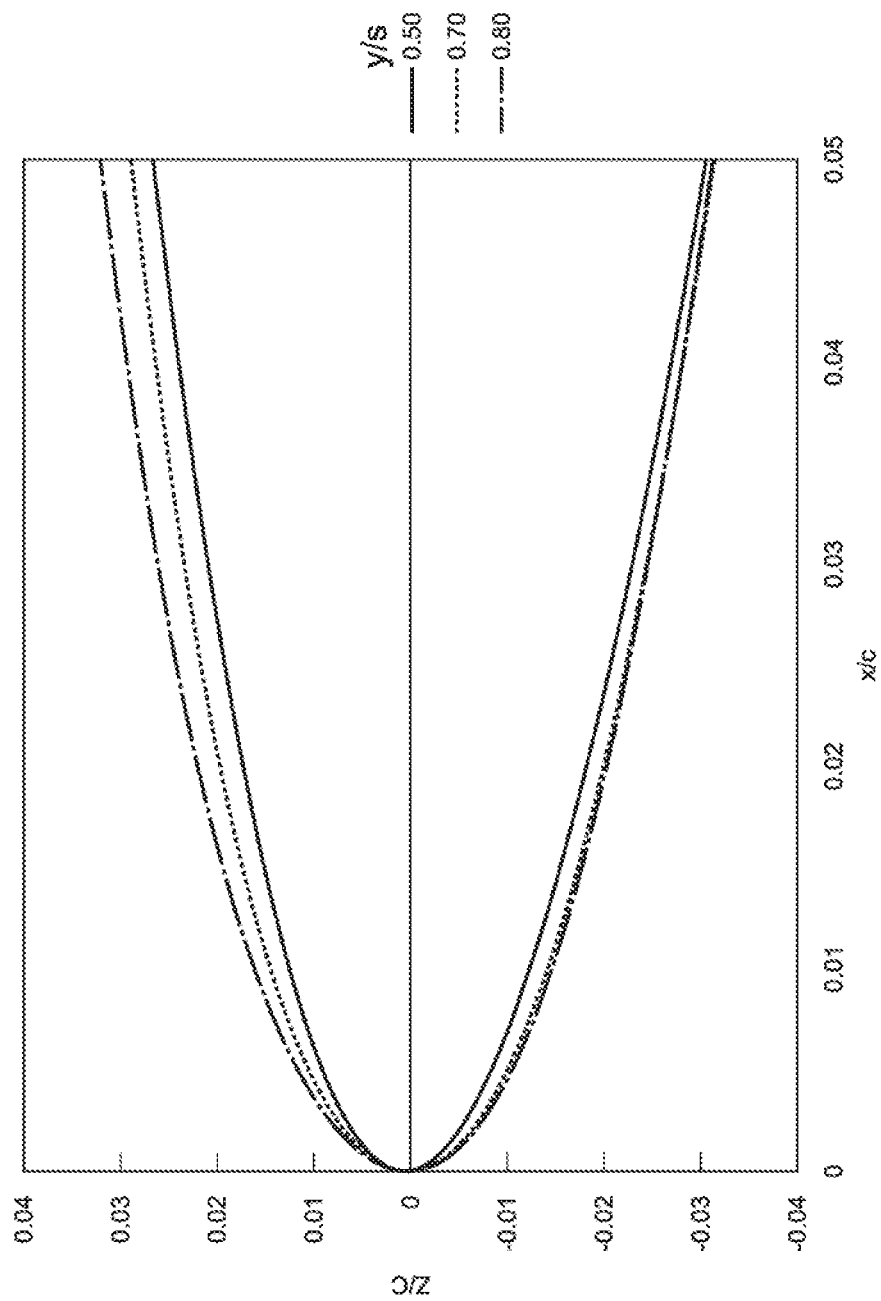
FIG. 20 An enlarged view of the vicinity of the leading edge of the cross-sectional shape shown in FIG. 19.

FIGS. 19 and 20 show a shape of the airfoil of such a wing 1. FIG. 19 shows a non-dimensionalized cross-sectional shape of the wing 1. FIG. 20 shows an enlarged view of the vicinity of the leading edge 11 of FIG. 19.

Figure 21:
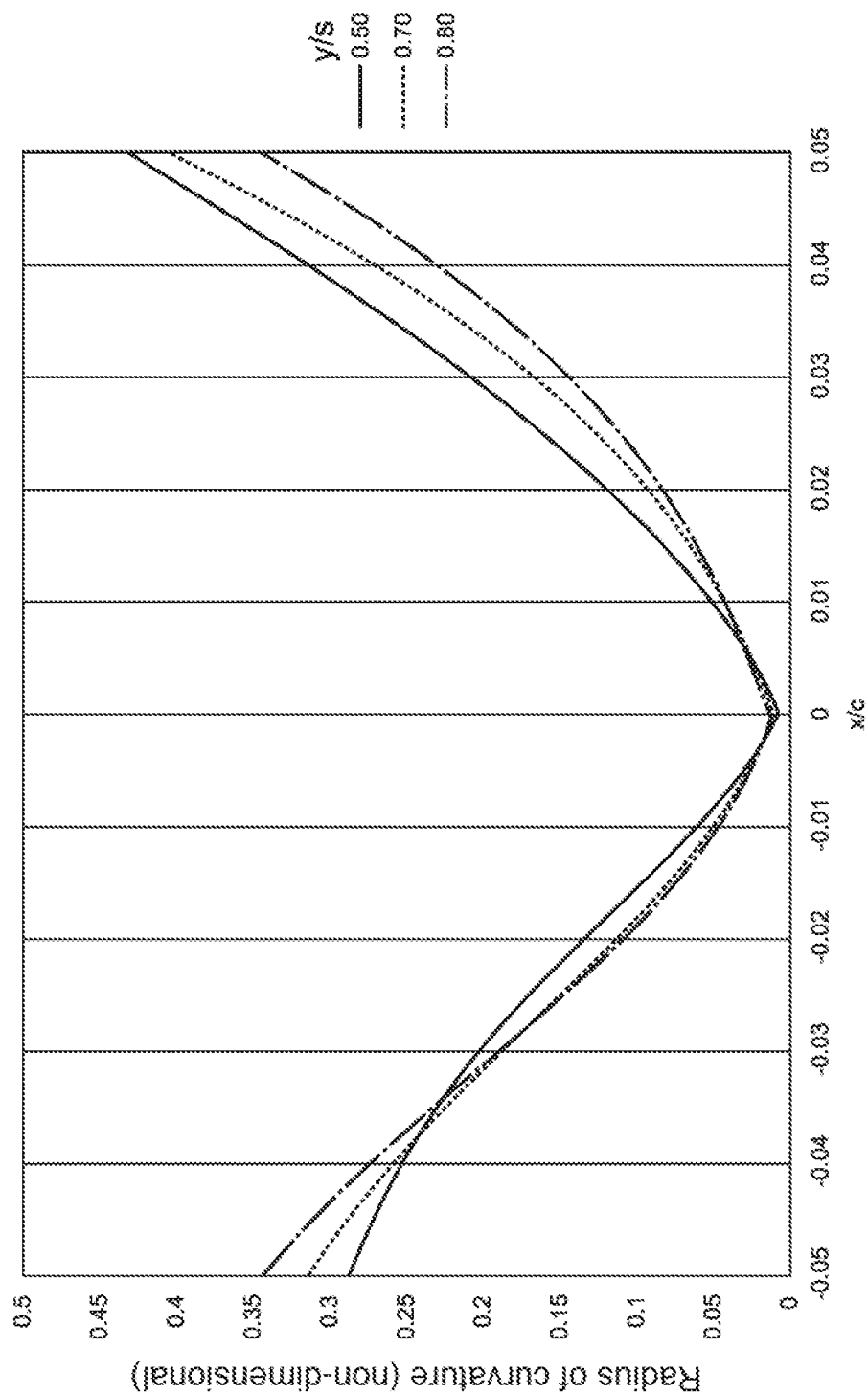
FIG. 21 A graph showing a non-dimensional radius of curvature of the vicinity of the leading edge including both of an upper surface and a lower surface of the wing (subsonic aircraft) according to the embodiment of the present invention.
Figure 22:
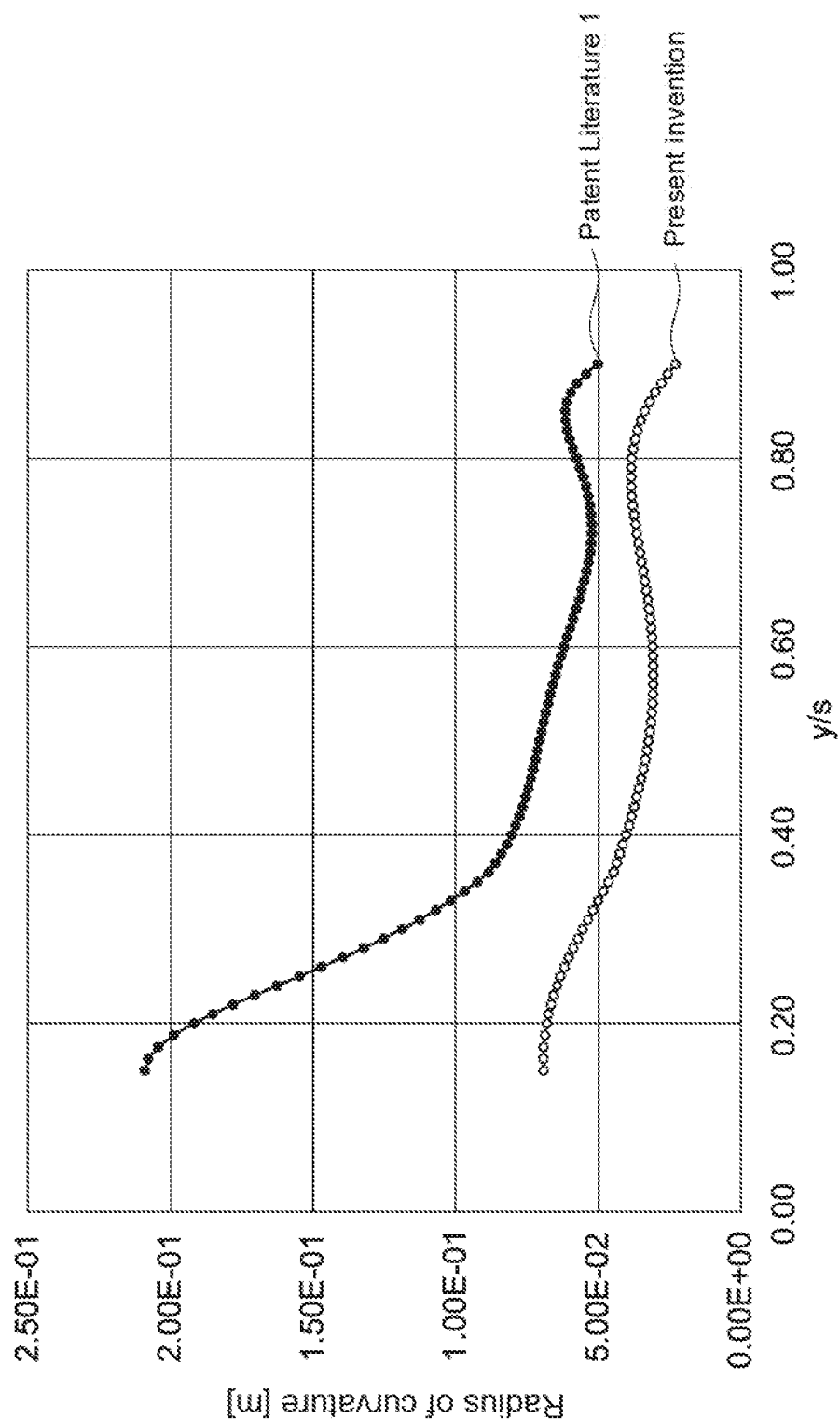
FIG. 22 A graph showing a dimensional radius of curvature of the leading edge of the wing (subsonic aircraft) according to the embodiment of the present invention.
Figure 23:
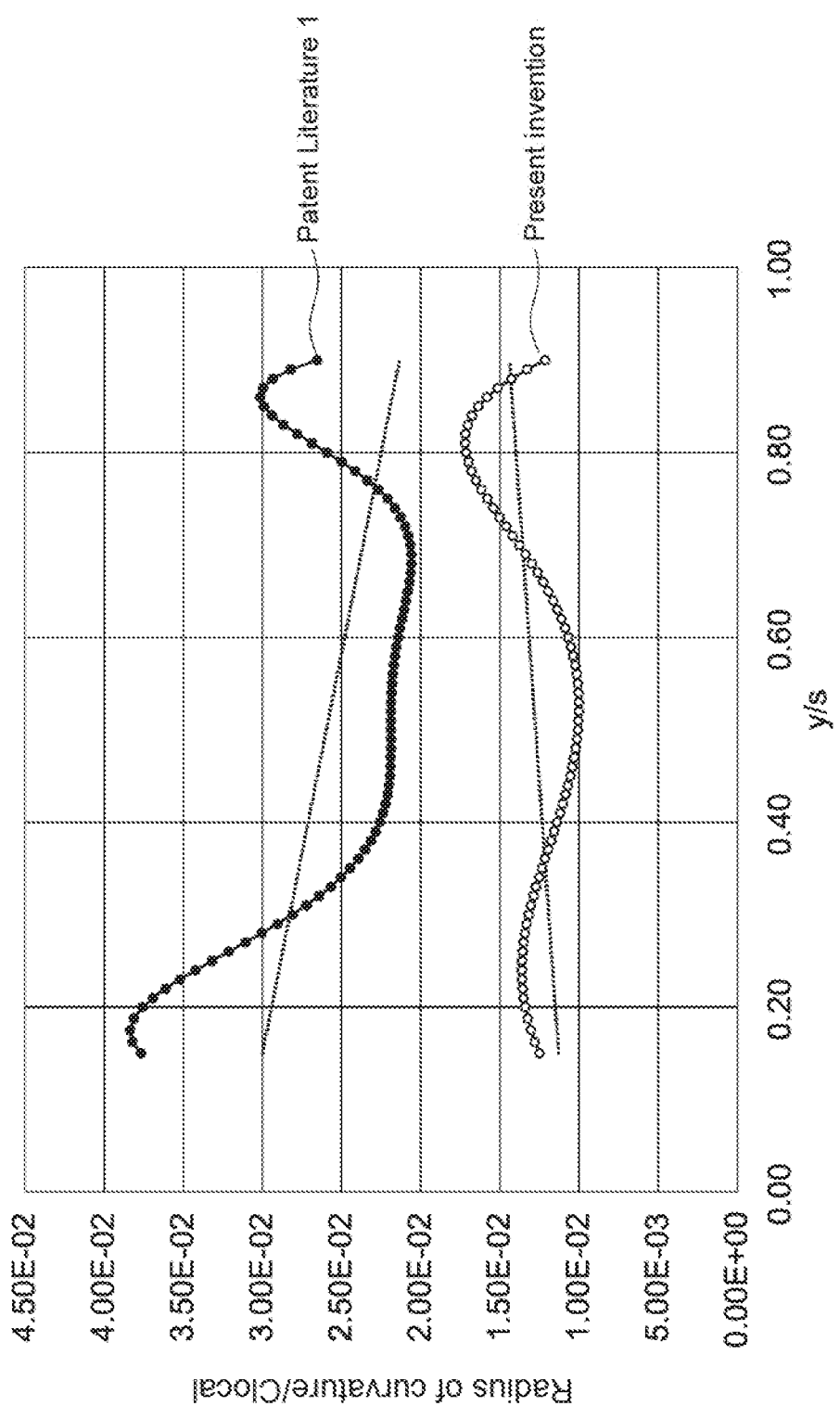
FIG. 23 A graph showing a non-dimensionalized radius of curvature of the leading edge of the wing (subsonic aircraft) according to the embodiment of the present invention.

FIGS. 21, 22, and 23 each show a radius of curvature of the leading edge of the wing 1 shown in FIGS. 19 and 20. FIG. 21 shows a non-dimensional radius of curvature of the vicinity of the leading edge 11 including both of an upper surface and a lower surface (x/c+ is the upper surface and − is the lower surface). FIG. 22 shows a dimensional radius of curvature (m) of the leading edge 11. FIG. 23 shows a non-dimensionalized radius of curvature of the leading edge 11. It should be noted that in FIGS. 22 and 23, the open circle (○) represents the radius of curvature of the leading edge of the wing 1 according to the present invention and the filled circle (●) represents the radius of curvature of the leading edge of the wing according to Patent Literature 1 as an reference example.

As shown in FIG. 22, as the dimensional radius of curvature of the leading edge of the wing 1 according to the present invention is compared to that of Patent Literature 1, the radius of curvature decreases from the wing root to the wing tip in the both cases. However, as can be seen shown in FIG. 23, as the non-dimensional radius of curvature of the leading edge of the wing 1 according to the present invention is compared to that of Patent Literature 1, the non-dimensional radius of curvature of the leading edge of Patent Literature 1 decreases from the wing root to the wing tip while the non-dimensional radius of curvature of the leading edge of the wing according to the present invention tends to increase from the wing root 17 to the wing tip 15. The wing 1 of the subsonic aircraft according to the present invention is thus clearly different from the airfoil according to Patent Literature 1 in this point.

Actions and Effects

The wing 1 of the subsonic aircraft has actions and effects similar to those of the supersonic aircraft described above. That is, the wing 1 of the subsonic aircraft according to the present invention is configured such that the pressure distribution (Cp) on the upper surface of the vicinity of the leading edge 11 increases from the wing root 17 to the wing tip 15 as in the supersonic aircraft. Therefore, the cross-flow component w can be reduced and the transition from the laminar flow to the turbulent flow due to the C-F instability can be suppressed. With this, the friction drag caused by the C-F instability can be reduced.

Figure 24:
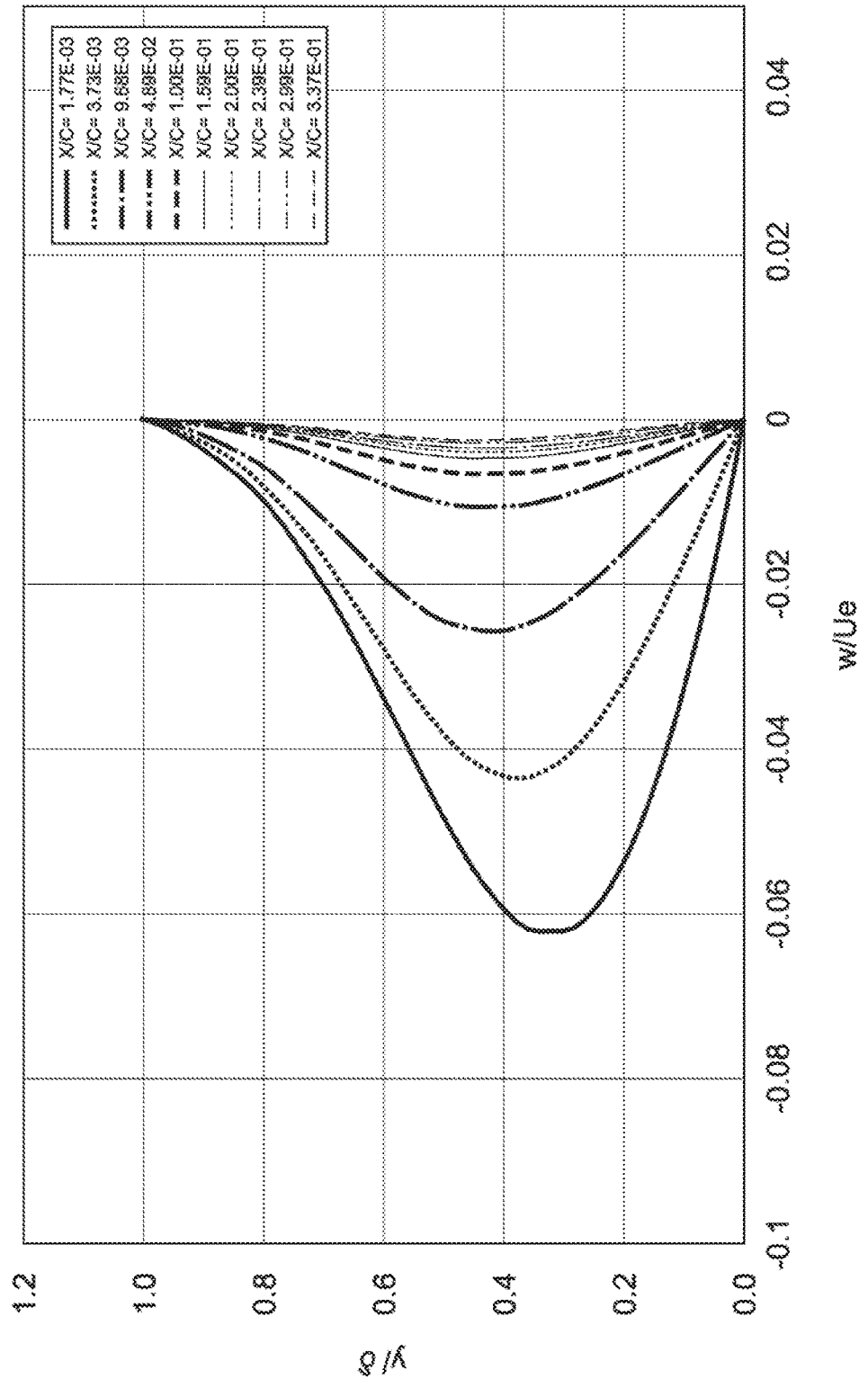
FIG. 24 A graph showing a profile of a pressure distribution associated with a cross-flow component of the wing (subsonic aircraft) according to the embodiment of the present invention.
Figure 25:
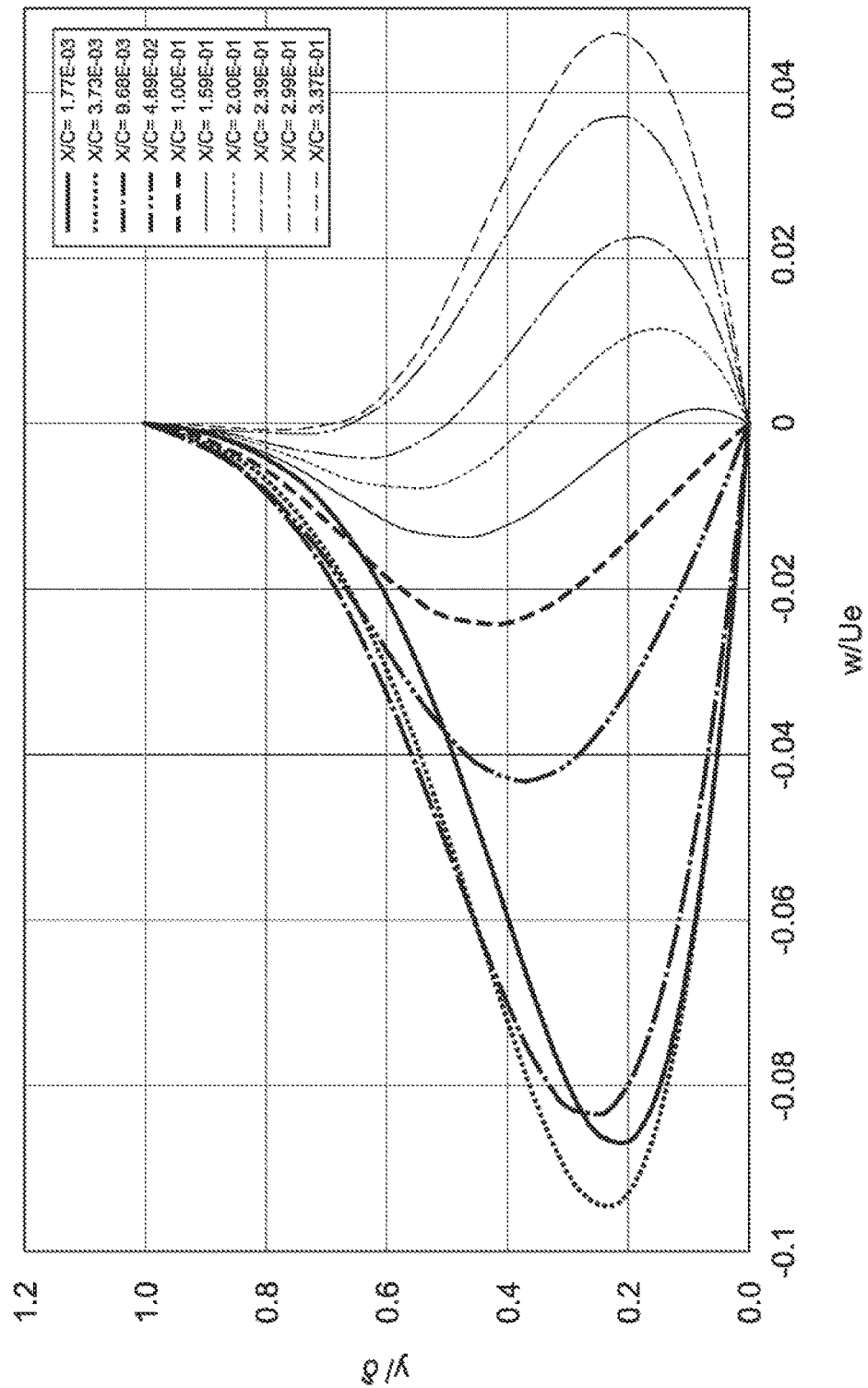
FIG. 25 A graph showing a profile of a pressure distribution associated with a cross-flow component of the wing (subsonic aircraft) according to Patent Literature 1.

FIG. 24 is a graph showing a profile of a pressure distribution associated with a cross-flow component of the wing 1 of the subsonic aircraft according to the present invention. FIG. 25 shows a profile of a pressure distribution associated with a cross-flow component of the wing of the subsonic aircraft according to Patent Literature 1 as an reference example. The both are the profile of the pressure distribution at a position of (y/s)=0.3 in the wingspan direction.

As can be seen from those figures, in the wing 1 of the subsonic aircraft according to the present invention, the ratio of the cross-flow component w to the external streamline $u_e$ ($w/u_e$) is smaller in the vicinity of the leading edge 11 of the wing 1 and the cross-flow component w is suppressed as compared to the wing according to Patent Literature 1.

Figure 26:
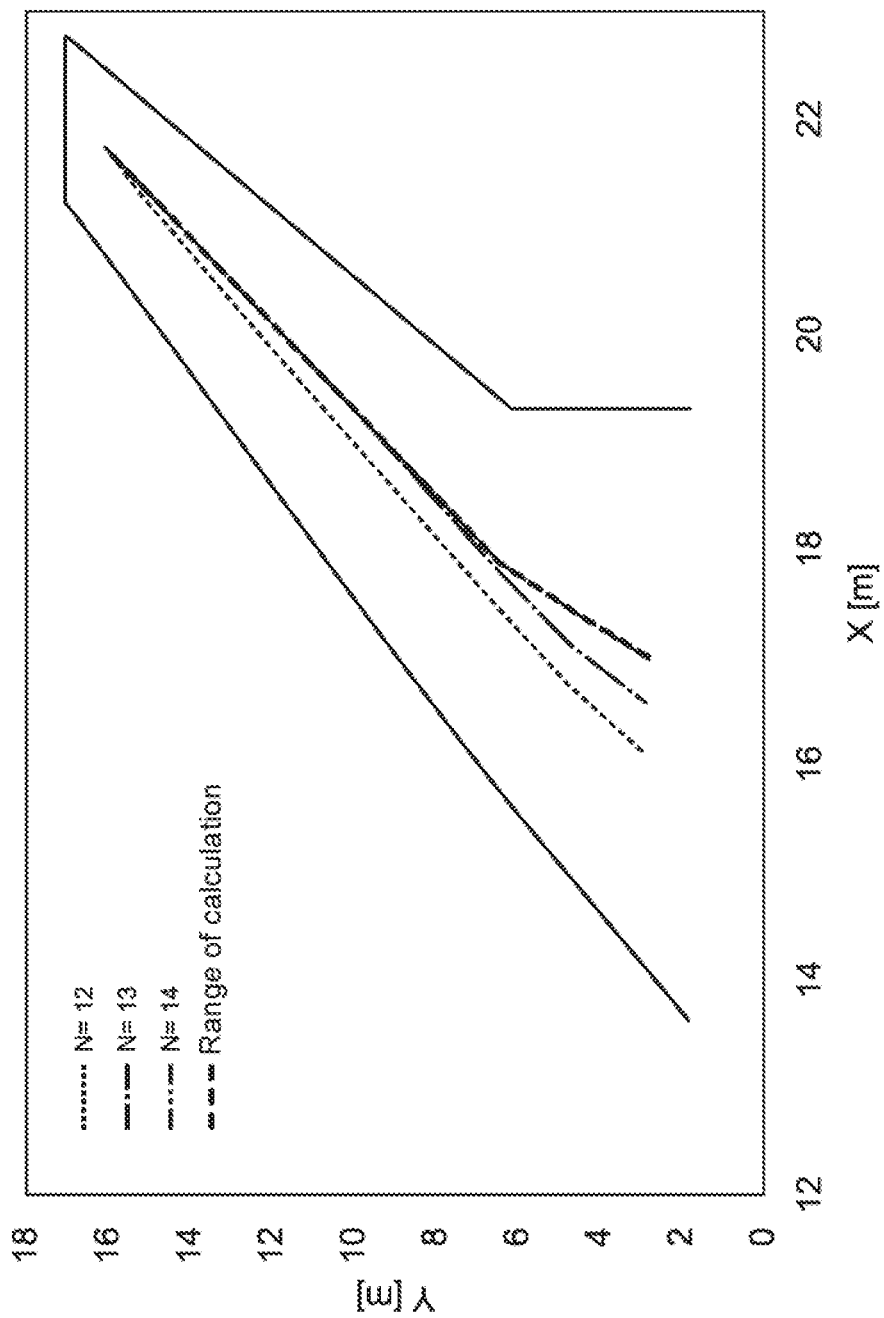
FIG. 26 A graph showing a transition point map of transition analysis results in the wing (subsonic aircraft) according to the embodiment of the present invention.
Figure 27:
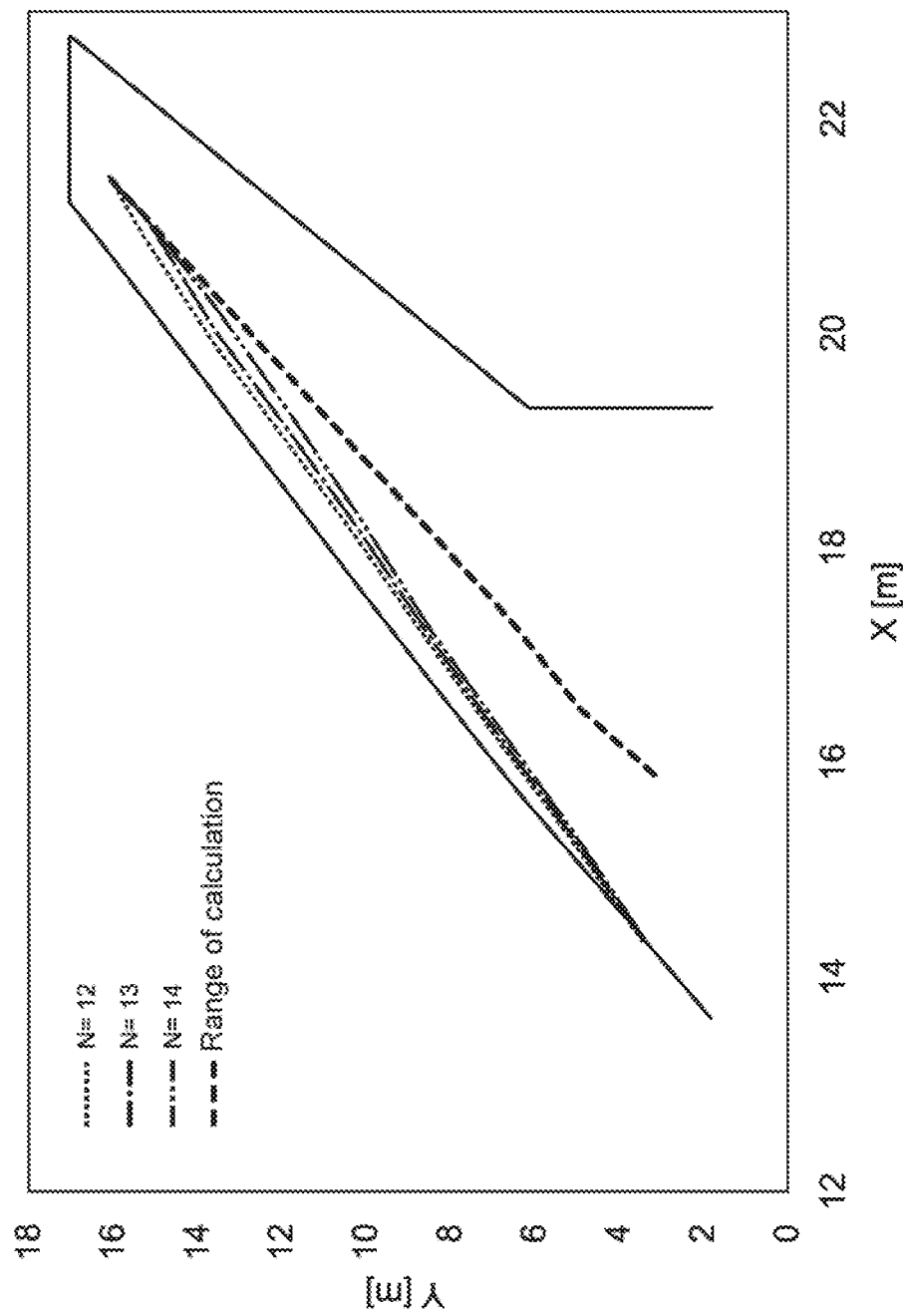
FIG. 27 A graph showing a transition point map of transition analysis results in the wing (subsonic aircraft) according to Patent Literature 1.

FIG. 26 is a graph showing a transition point map of transition analysis results in the wing 1 of the subsonic aircraft according to the present invention. FIG. 27 shows a transition point map of transition analysis results in the wing according to Patent Literature 1 as an reference example.

As can be seen from those figures, in the wing 1 according to the present invention, the transition point is moved to the downstream side of the wing and the laminar flow region is wider as compared to the wing according to Patent Literature 1.

CONCLUSION

In the wing 1 according to the above-mentioned embodiment, the pressure distribution (Cp) on the upper surface of the vicinity of the leading edge 11 increases from the wing root 17 to the wing tip 15. The cross-flow component can be thus reduced. The transition from the laminar flow to the turbulent flow can be suppressed. With this, the friction drag caused by the cross-flow instability can be reduced.

Moreover, with this wing 1, an ideal pressure distribution suitable for natural laminarization is determined by grasping a relationship between a pressure distribution and transition by using a transition point prediction method, and its shape is also determined. Therefore, it is easy to make a design.

Furthermore, the shape of that wing 1 is adapted such that the non-dimensionalized radius of curvature of the leading edge increases from the wing root 17 to the wing tip 15. Therefore, the leading-edge shape is not sharper toward the wing tip 15, and it is also easy to manufacture it.

It should be noted that the present invention is not limited to the above-mentioned embodiment, various modifications and applications can be made without departing from the scope of the technological concept thereof, and the various modifications and applications can also be encompassed in the technological scope of the present invention.

For example, by applying the present invention to a fin stabilizer to be used for a watercraft and the like, it can also serve to reduce large drag on the watercraft body at sea owing to laminarization of the stabilizer.

REFERENCE SIGNS LIST 1 wing
11 leading edge
15 wing tip 17 wing root
100 aircraft
Λ swept-back angle

The invention claimed is:

1. A wing having a swept-back angle, which is configured such that
a surface pressure on an upper surface of a vicinity of a leading edge of the wing in a fluid increases from a wing root to a wing tip,
wherein the vicinity of the leading edge of the wing is within a range of 0% to 5% from the leading edge of the wing in a wing chord direction, and
wherein the wing is configured such that a rising gradient of the surface pressure on the upper surface of the vicinity of the leading edge of the wing in the fluid is systematically gentler from the wing root to the wing tip.

2. The wing according to claim 1, which is configured such that
a non-dimensionalized radius of curvature of the leading edge increases from the wing root to the wing tip.

3. The wing according to claim 2, which is configured such that
a dimensionalized radius of curvature of the leading edge decreases from the wing root to the wing tip.

4. The wing according to claim 1, wherein
the surface pressure on the upper surface of the vicinity of the leading edge in the fluid is expressed by a function of Expression 1 below:

[Expression 1]

$$Cp(\xi, \eta) = \sum_{i=0}^{n} A_i(\eta) f_i(\xi, \eta) \quad \text{(Expression 1)}$$

$$\xi \equiv x/c,$$
$$\eta \equiv y/s$$
$$f_0(\xi, \eta) \equiv 1,$$
$$f_i(\xi, \eta) \equiv \exp[B_i(\eta)\xi^{P_i}] - 1, i = 1, \ldots, n-1$$
$$f_n(\xi, \eta) \equiv \xi^{P_n}$$

where n=5 in a case of a supersonic aircraft and n=7 in a case of a subsonic aircraft, x is a position in the wing chord direction, y is a position in a wingspan direction, and c is a local wing chord length of the wing.

5. The wing according to claim 4, wherein
$B_2(\eta)$ of Expression 1 above is expressed by Expression 2 below:

[Expression 2]

$$B_2(\eta) = \left( \Lambda_{LE}(\eta) \sum_{i=0}^{2} \alpha_i \eta^i \right) \times \text{fudge factor} \quad \text{(Expression 2)}$$

where $\eta \equiv y/s$
$\Lambda_{LE} \equiv$ Swept-back Angle at $\eta$ station [rad]
fudge factor $\equiv$ Fine adjustment factor
for adjusting Re number effect and the
like. (used in range of [0, 1] considering case of
size of actual aircraft with highly swept-
back wing, high-Reynolds number as 1)
$\alpha_0 = -105000$
$\alpha_1 = 198000$
$\alpha_2 = -95000$.

6. An aircraft comprising a wing having a swept-back angle, which is configured such that
a surface pressure on an upper surface of a vicinity of a leading edge of the wing in a fluid increases from a wing root to a wing tip,
wherein the vicinity of the leading edge of the wing is within a range of 0% to 5% from the leading edge of the wing in a wing chord direction, and
wherein the wing is configured such that a rising gradient of the surface pressure on the upper surface of the vicinity of the leading edge of the wing in the fluid is systematically gentler from the wing root to the wing tip.

* * * * *